US010440898B2

(12) United States Patent
Gaudreault

(10) Patent No.: US 10,440,898 B2
(45) Date of Patent: *Oct. 15, 2019

(54) BRUSH CHIPPER ASSEMBLY WITH COUNTER-ROTATING FEEDER ROLLERS AND ACTUATING CHIPPING HEADS

(71) Applicant: Gyro-Trac Corporation, Summerville, SC (US)

(72) Inventor: Daniel Gaudreault, Summerville, SC (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/437,708

(22) Filed: Feb. 21, 2017

(65) Prior Publication Data

US 2017/0164563 A1 Jun. 15, 2017

Related U.S. Application Data

(63) Continuation of application No. 14/462,734, filed on Aug. 19, 2014, now Pat. No. 9,610,705.

(60) Provisional application No. 61/959,298, filed on Aug. 20, 2013.

(51) Int. Cl.
| | | |
|---|---|---|
| *A01G 3/00* | (2006.01) | |
| *B02C 18/14* | (2006.01) | |
| *B02C 18/22* | (2006.01) | |
| *B27L 11/06* | (2006.01) | |
| *B02C 25/00* | (2006.01) | |
| *B27L 11/02* | (2006.01) | |

(52) U.S. Cl.
CPC ............ *A01G 3/002* (2013.01); *B02C 18/142* (2013.01); *B02C 18/2283* (2013.01); *B02C 25/00* (2013.01); *B27L 11/02* (2013.01); *B27L 11/06* (2013.01); *B02C 2201/066* (2013.01)

(58) Field of Classification Search
CPC ... B02C 18/142; B02C 18/2283; A01G 3/002; B27L 11/06
USPC .................................. 241/236, 225, 101.76
See application file for complete search history.

(56) References Cited

U.S. PATENT DOCUMENTS

| | | | | |
|---|---|---|---|---|
| 4,339,083 A | * | 7/1982 | Linzberger | B02C 4/38 241/232 |
| 4,690,187 A | * | 9/1987 | Schmidt | B27L 1/122 144/208.7 |
| 5,060,874 A | * | 10/1991 | Sidney, Jr. | B02C 4/30 241/231 |

(Continued)

*Primary Examiner* — Faye Francis
(74) *Attorney, Agent, or Firm* — Southeast IP Group, LLC; Thomas L. Moses

(57) ABSTRACT

A brush chipper assembly has a housing and a feeder subassembly connected to the housing. The feeder subassembly includes opposed, first and second feeder rollers. When the feeder subassembly is actuated, the first feeder roller is operable to rotate in a first direction and the second feeder roller is operable to rotate in a second direction (opposite to the first direction) so as to draw the brush into the housing. Also provided is a chipping subassembly substantially contained within the housing behind the feeder subassembly. The chipping subassembly including first and second, opposed chipping heads, each of which carrying cutting teeth for chipping the brush. When the chipping subassembly is actuated, the first chipping head is operable to rotate in a third direction and the second chipping head is operable to rotate in a fourth direction (opposite to the second direction).

20 Claims, 24 Drawing Sheets

(56) References Cited

U.S. PATENT DOCUMENTS

| | | | | |
|---|---|---|---|---|
| 5,088,532 | A * | 2/1992 | Eggers | B27L 11/002 |
| | | | | 144/176 |
| 5,522,557 | A * | 6/1996 | Tiggesbaumker | B02C 4/32 |
| | | | | 241/227 |
| 6,685,118 | B1 * | 2/2004 | Williams, Jr. | B02C 4/32 |
| | | | | 241/232 |
| 6,722,596 | B1 * | 4/2004 | Morey | A01G 3/002 |
| | | | | 241/225 |
| 6,776,366 | B2 * | 8/2004 | Tschesche | B02C 4/42 |
| | | | | 100/168 |
| 6,830,204 | B1 * | 12/2004 | Morey | A01G 3/002 |
| | | | | 241/34 |
| 7,232,083 | B2 * | 6/2007 | Stelter | A01G 3/002 |
| | | | | 241/30 |
| 7,546,964 | B2 * | 6/2009 | Bouwers | B02C 18/145 |
| | | | | 144/248.7 |
| 7,597,279 | B1 * | 10/2009 | Stelter | A01G 3/002 |
| | | | | 241/28 |
| 7,997,516 | B2 * | 8/2011 | Raaz | B02C 4/28 |
| | | | | 241/143 |
| 9,610,705 | B2 * | 4/2017 | Gaudreault | B02C 18/142 |
| 2008/0272215 | A1 * | 11/2008 | Bouwers | B02C 18/145 |
| | | | | 241/28 |
| 2009/0152386 | A1 * | 6/2009 | Stelter | A01G 3/002 |
| | | | | 241/225 |
| 2010/0001107 | A1 * | 1/2010 | Kallenbach | B02C 18/2283 |
| | | | | 241/34 |

* cited by examiner

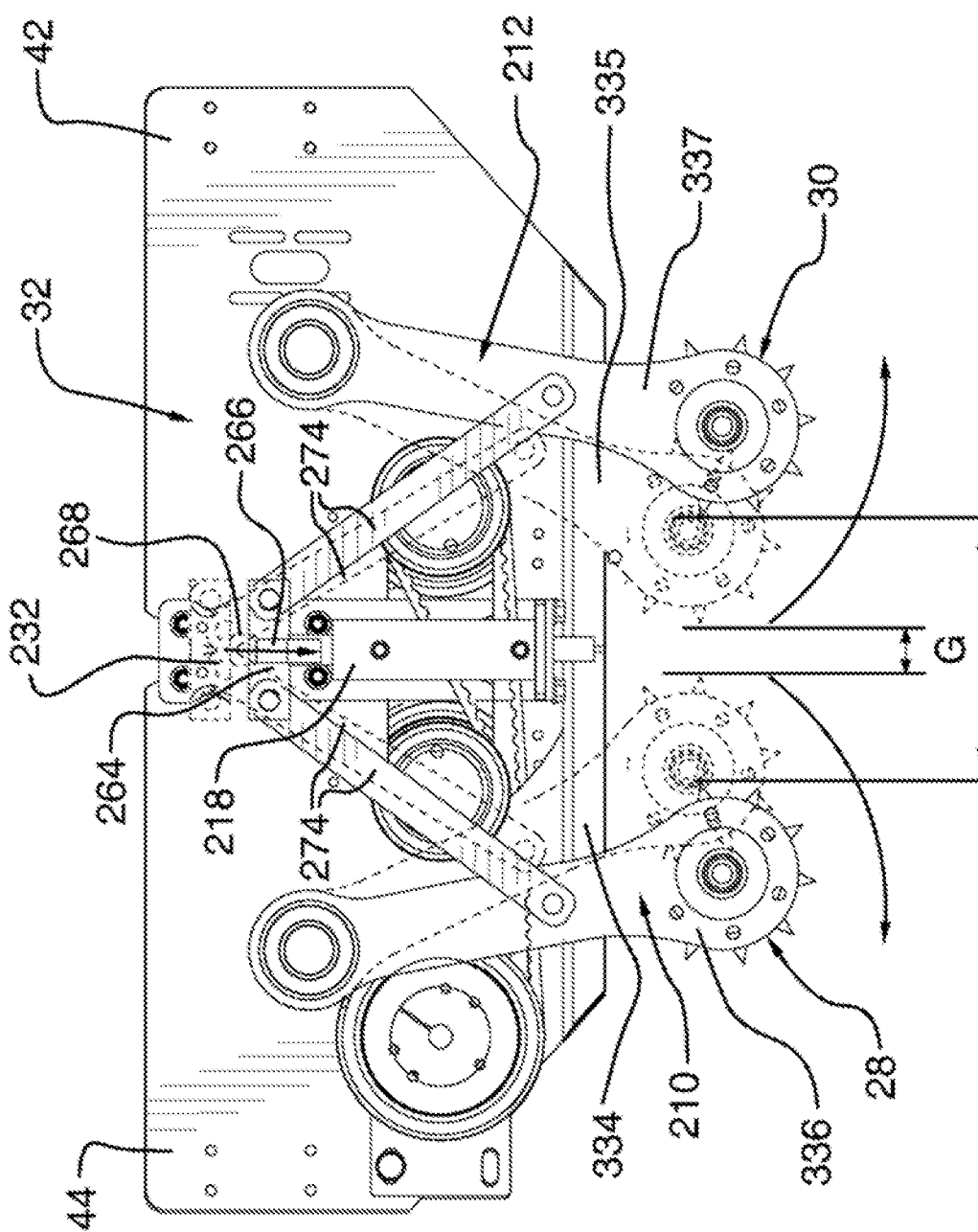

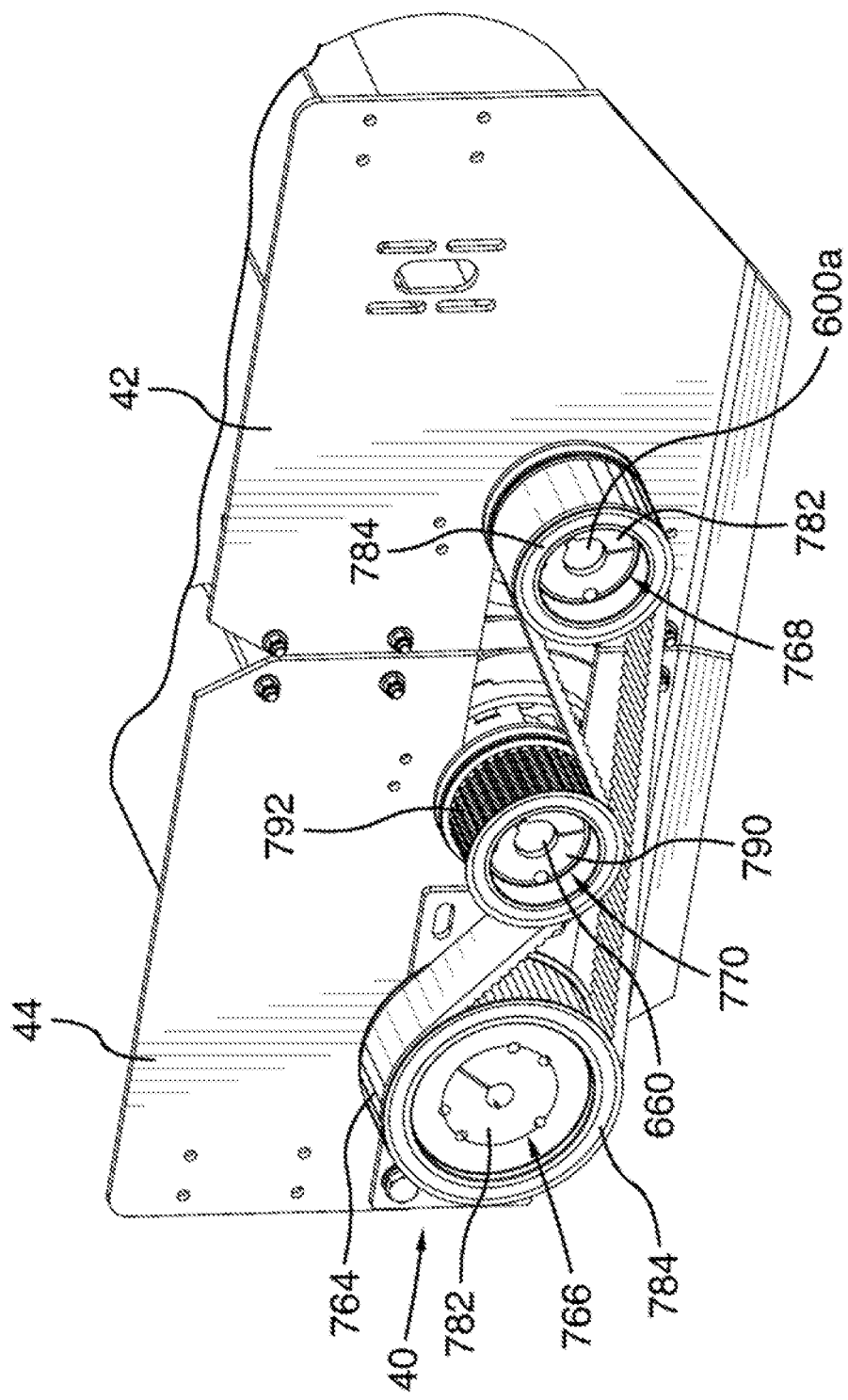

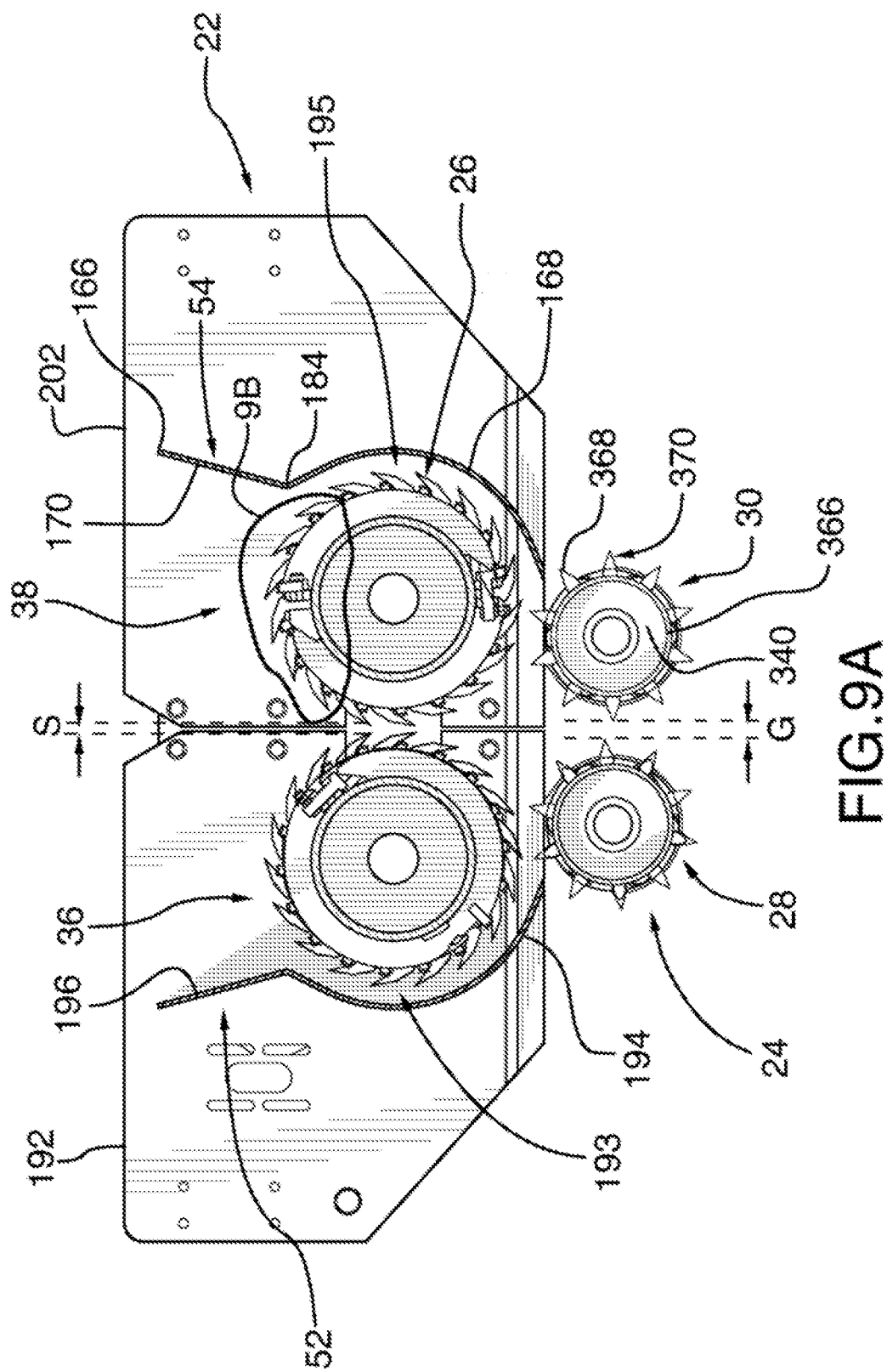

US 10,440,898 B2

BRUSH CHIPPER ASSEMBLY WITH COUNTER-ROTATING FEEDER ROLLERS AND ACTUATING CHIPPING HEADS

BACKGROUND OF THE INVENTION

Conventional brush chippers are typically configured with a housing which accommodates a single, relatively large, rotatable drum or roller. In such chippers, the drum is mounted for rotation about a horizontal axis. Carried on the outer surface of the drum is a plurality of cutting or chipping elements which are designed to make contact with the brush as the drum is rotated, and to reduce the brush to chips. Such chippers often have a conveyor system consisting of combination of one or more conveyor belts or feeder rollers. This system serves to transport the brush being fed into the front of the housing, rearward toward the drum. Commonly, the drum is rotated in a clockwise direction such that the horizontal component of the force exerted by the cutting elements on the brush acts in the same rearward direction.

To improve effective chipping action of their brush chippers, some brush chipper manufacturers have increased the size of their drum to expose the brush to a broader chipping area. These large diameter brush chippers tend to be very powerful and exhibit good chipping abilities, but because of their weight they tend to draw more power than smaller-sized drums and require a more robust support frame and bearings. Also, based on safety considerations, there may be some constraints as to the speed at which such drums may be rotated.

In light of the foregoing, it would be advantageous to have a brush chipper assembly that exhibits enhanced chipping action without requiring the use of a relatively, large sized, heavy drum with significant energy demands.

BRIEF SUMMARY OF THE INVENTION

In accordance with one broad aspect of the present invention, there is provided a brush chipper assembly which has a housing and a feeder subassembly connected to the housing. The feeder subassembly includes opposed, first and second feeder rollers. When the feeder subassembly is actuated, the first feeder roller is operable to rotate in a first direction and the second feeder roller is operable to rotate in a second direction so as to draw the brush to be chipped into the housing. The first direction of rotation is opposite to the second direction of rotation. The brush chipper assembly is also provided with a chipping subassembly substantially contained within the housing behind the feeder subassembly. The chipping subassembly includes first and second, opposed chipping heads and a drive assembly for driving rotation of the first and second chipping heads. Each chipping head carries a plurality of cutting teeth for chipping the brush fed into the brush chipper assembly. When the chipping subassembly is actuated, the first chipping head is operable to rotate in a third direction and the second chipping head is operable to rotate in a fourth direction. The third direction of rotation is opposite to the fourth direction of rotation and the first direction of rotation. The fourth direction of rotation is opposite to the second direction of rotation.

DESCRIPTION OF THE DRAWINGS

The embodiments of the present invention shall be more clearly understood with reference to the following detailed description of the embodiments of the invention taken in conjunction with the accompanying drawings, in which:

FIG. 6B is another top plan view similar to that shown FIG. 6A except that the left and right feeder rollers of the feeder subassembly are shown moving from their respective first positions (depicted in dashed lines) to their respective second positions (depicted in solid lines) wherein a preset maximum gap exists between the left and right feeder rollers;

FIG. 7B is a partial perspective view of the brush chipper assembly illustrated in FIG. 7A showing the drive assembly of the chipping subassembly;

FIG. 9A is a cross-sectional view of the brush chipper assembly shown in FIG. 2 taken along line "9A-9A" with the hydraulic motor of the drive assembly omitted for clarity;

DETAILED DESCRIPTION OF THE INVENTION

Figure 1:
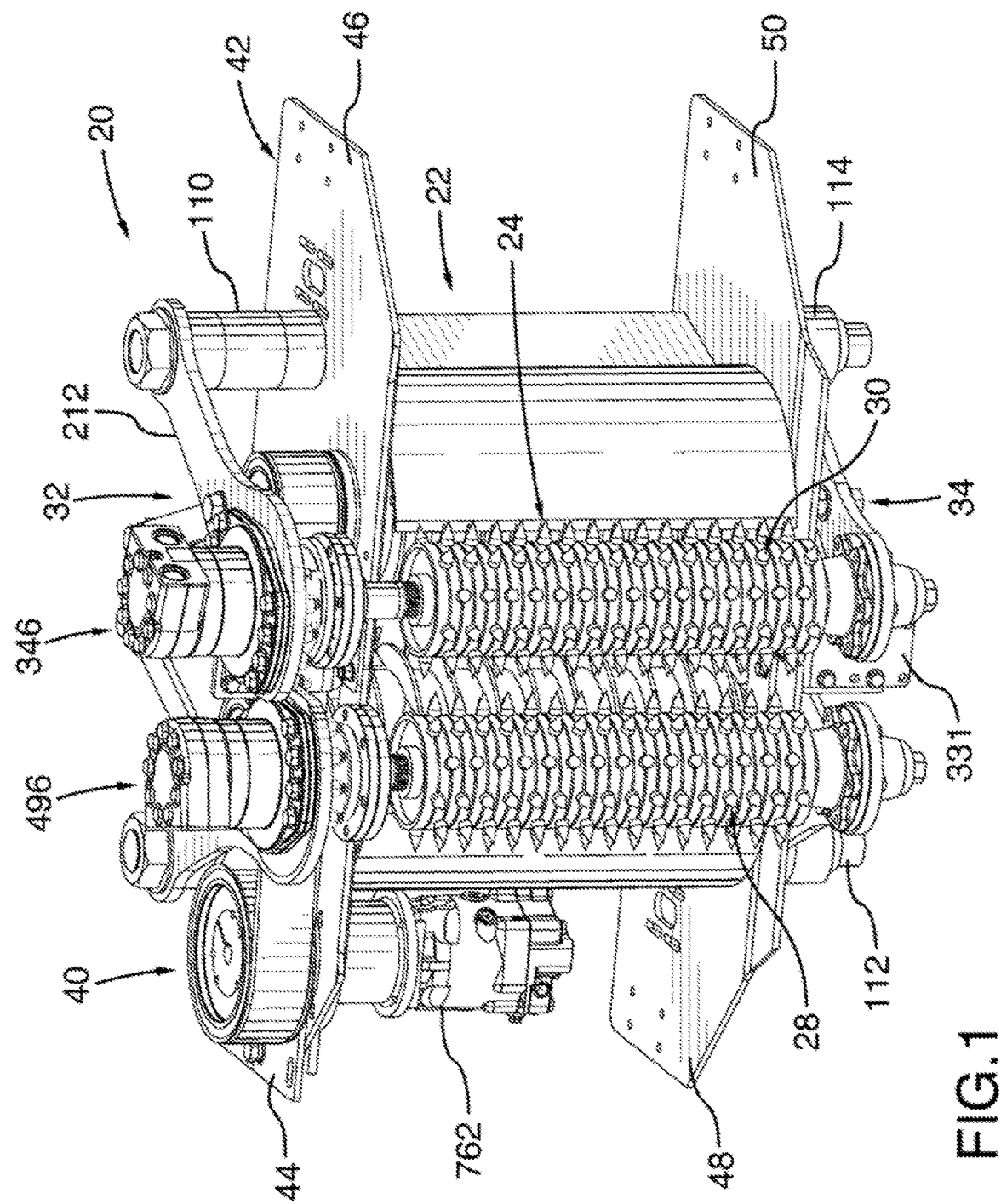
FIG. 1 is a front view looking down taken at a brush chipper assembly according to an embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIGS. 1 to 5, there is shown a brush chipper assembly generally designated with reference numeral 20. The brush chipper assembly 20 is operable to reduce felled trees, tree trimmings, branches or other like feedstock into wood chips and cutting debris. It is of the type which may be attached to a frame provided at the end of a hopper, a trailer or the like, or which may be incorporated as part of a combined chipping and baling machine or other similar machine. The brush chipper assembly 20 includes a housing 22, a feeder subassembly 24 carried in front of the housing 22, and a chipping subassembly 26 substantially contained within the housing 22 behind the feeder subassembly 24.

Figure 10:
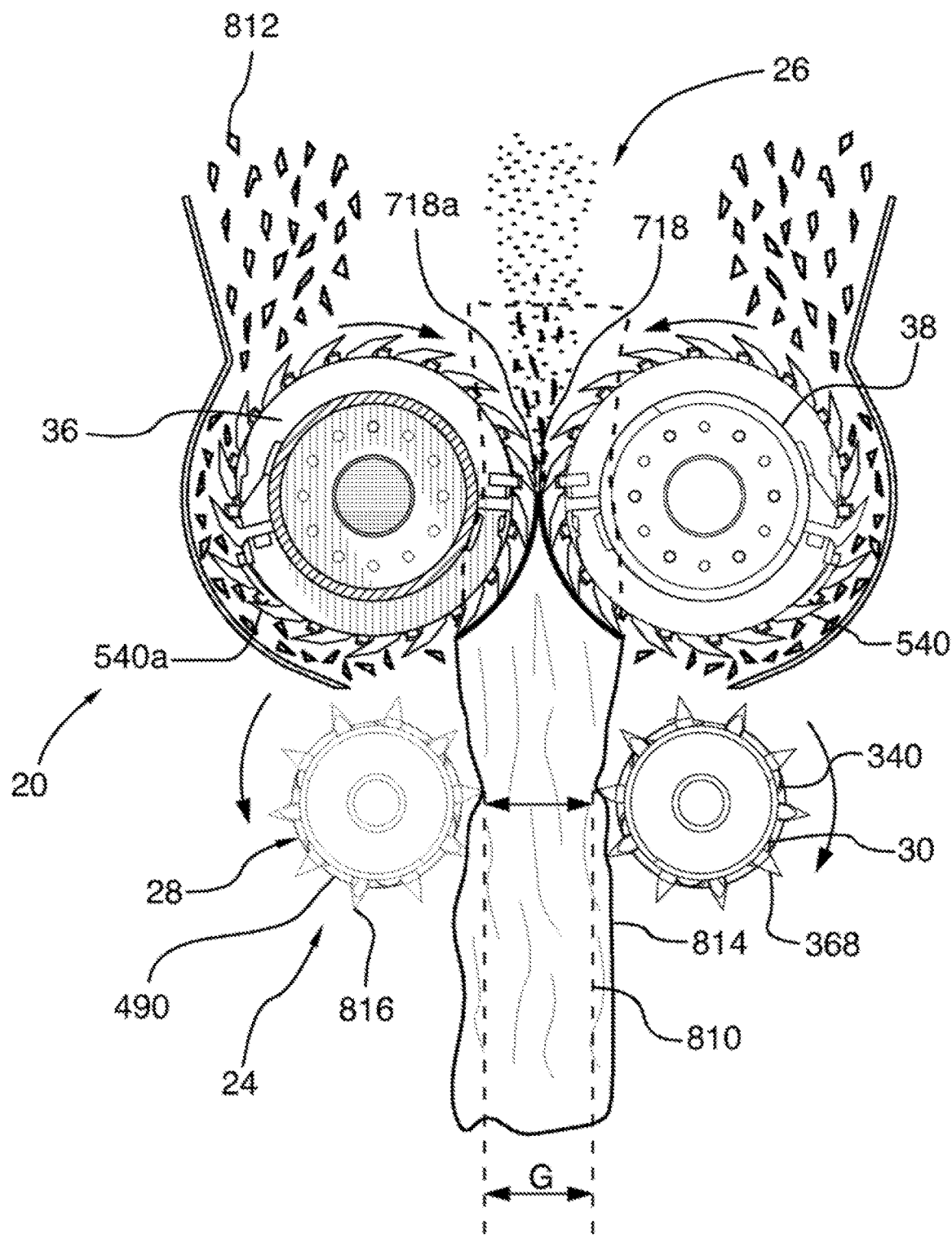
FIG. 10 is a schematic cross-sectional view similar to that shown in FIG. 9A showing a tree branch being drawn into the brush chipper assembly by the counter-rotating left and right feeder rollers and being acted upon by the oppositely counter-rotating left and right chipper rollers to produce wood chips therefrom.

By way of general overview, the feeder subassembly 24 includes opposed, vertically extending, left and right feeder rollers 28 and 30, and upper and lower linkage mechanisms 32 and 34 connected to the feeder rollers 28 and 30 and operable to adjust the gap G between the left feeder roller 28 and the right feeder roller 30. When counter-rotated (i.e. when each is rotated in a direction opposite to the other), the feeder rollers 28 and 30 co-operate with each other to draw rearwardly into the chipping subassembly 26 the felled trees, tree trimmings, branches or the like which are to be reduced to wood chips. As depicted in FIG. 10, to achieve this result, the left feeder roller 28 is rotated counter-clockwise and the right feeder roller 30 is rotated clockwise.

The main components of the chipping subassembly 26 are opposed, vertically extending, left and right chipping heads 36 and 38, and a drive assembly 40 for driving rotation of the left and right chipping heads 36 and 38. The chipping heads carry a plurality of cutting teeth for chipping the feedstock. During actuation of the chipping subassembly 26, the left and right chipping heads 36 and 38 are also counter-rotated (i.e. each is rotated in a direction opposite to the other) to reduce the feedstock to wood chips and chipping debris. However, as will be explained in greater detail below, the rotation of the chipping heads 36 and 38 is such that it opposes the advance of the feedstock further into the housing 22. This occurs because the left chipping head 36 is rotated clockwise (in a direction opposite to that of the left feeder roller 28) and the right chipping head 38 is rotated counter-clockwise (in a direction opposite to that of the right feeder roller 30), as shown in FIG. 10. The horizontal component of the force generated by the impact of the cutting teeth on the feedstock, acts in a direction opposite to the direction of the propulsive force of the feeder rollers 36 and 38 (i.e. the direction of travel of the branch 810). As a result, a more effective chipping action may be achieved.

Further, the chipping heads may be operable to adjust the gap between the left and right chipping heads 36 and 38 in similar fashion to the adjustable actuating feeder rollers 28 and 30. In a preferred embodiment, the feeder rollers 28 and 30 have at least one sensor thereon for detecting the width of the gap G between the feeder rollers 28 and 30 and for triggering adjustment of the chipping heads 36 and 38. For example, if feeder rollers 28 and 30 reach a predetermined width, actuation of the adjustable chipping heads 36 and 38 may be triggered, thereby widening the gap between the left and right chipping heads 36 and 38 to accommodate feedstock exceeding a predetermined diameter.

Figure 11:
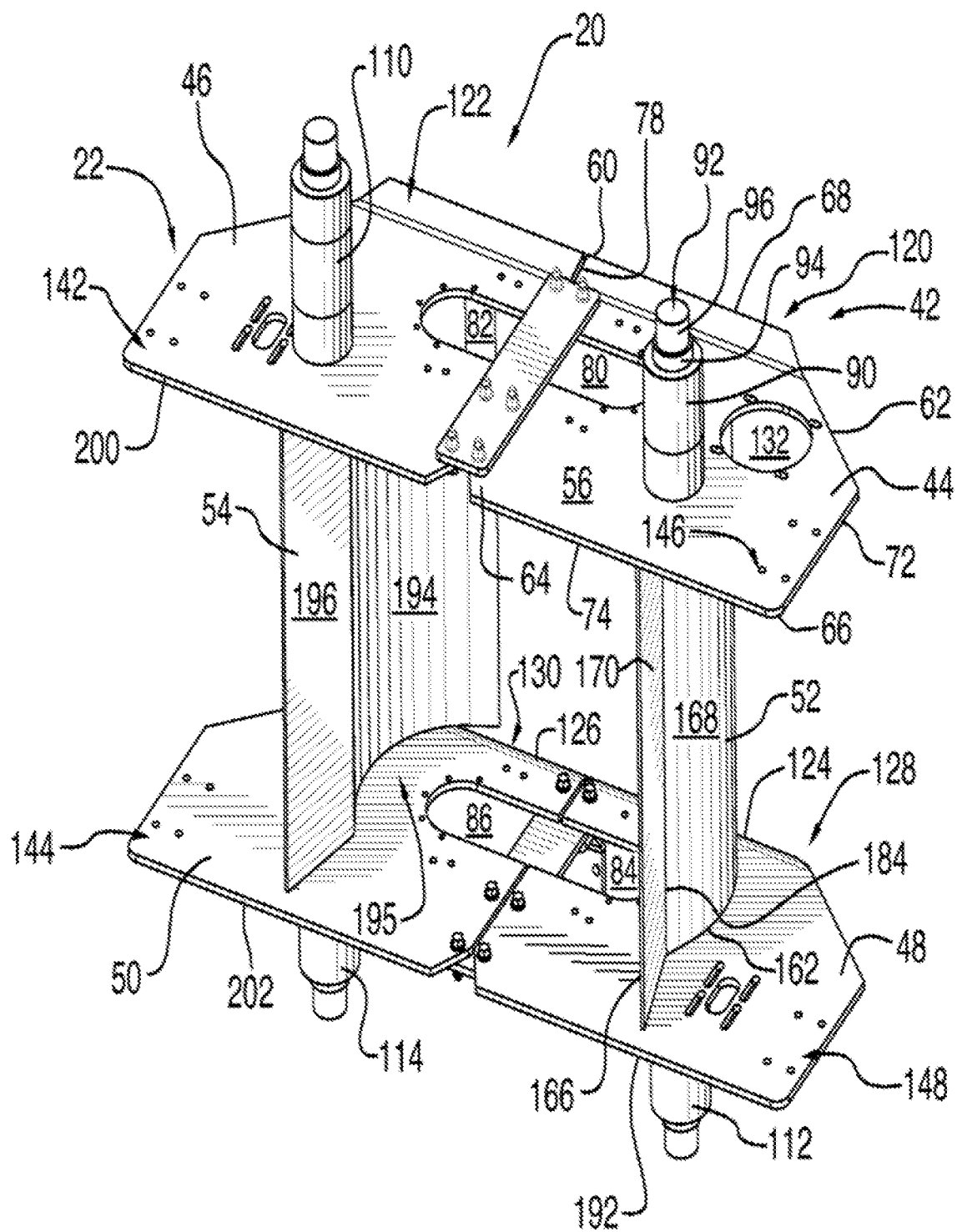
FIG. 11 is an isolated perspective view of the housing of the brush chipper assembly shown in FIG. 1.

Turning now to a more detailed discussion of the elements referred to above and with reference to FIGS. 9 and 11, the housing 22 has a frame 42 of welded construction which is made up of several frame elements, namely: top left and right panels 44 and 46, bottom left and right panels 48 and 50 disposed opposite the top panels 44 and 46, a left sidewall member 52 extending between the top left panel 44 and the bottom left panel 48, and a right sidewall member 54 extending between the top right panel 46 and the bottom right panel 50. The top left panel 44, the bottom left panel 48 and the left sidewall member 52 are arranged to form a mirror image of the top right panel 46, the bottom right panel 50 and the right sidewall member 54. In like fashion, the top left and right panels 44 and 46, and the bottom left and right panels 48 and 50 are symmetrically arranged about a notional horizontal plane H extending through the frame 42.

As a result of the horizontal and vertical symmetry of the frame 42, the panels 44, 46, 48 and 50 resemble each other, such that the description of top left panel 44 will generally suffice for the other panels 46, 48 and 50. Where necessary, a more specific description of the other panels 46, 48 and 50 will be provided. Top left panel 44 is fabricated from structural steel and has a top face 56 and a bottom face 58 (visible in FIG. 5). The panel 44 is generally square-shaped with two truncated corner portions 62 and 64 trimmed at an angle one of which (corner portion 62) significantly so. The corner portion 66 is smoothly radiused. The shape of the panel 44 is defined by a plurality of edges, namely: a front edge 68 extending between front right and left right corner portions 60 and 62; a left side edge 72 extending between the front left corner portion 62 and the rear left corner portion 66; a rear edge 74 running between the rear left corner portion 66 and the rear right corner portion 64; and a right side edge 78 extending between the rear right corner edge 76 and the front right corner portion 60.

Cut into the right side edge 78 at a location closer to corner portion 60 than to corner portion 64, is an oblong rebate 80. A corresponding rebate 82 is formed in the top right panel 46 and because of the symmetry of the frame 42 the rebate 82 is disposed directly opposite to the rebate 80. The rebate 80 in the top left panel 44 is aligned with a corresponding rebate 84 formed in the bottom left panel 48.

The rebates 80 and 84 are configured to receive portions of the left chipping head 36. Similarly, a rebate 82 in the top right panel 46 is aligned with a corresponding rebate 86 defined in the bottom right panel 50. The rebates 82 and 86 are configured to receive portions of the right chipping head 38.

The top left panel 44 also has a cylindrical support member 90 that stands tall from, and is welded to, it's top face 56 at a location closer to rear and left side edges 74 and 72 than to the front and right side edges 68 and 78. The support member 90 carries a short post 92 which is configured for engagement with a portion of the upper linkage mechanism 32. The short post 92 includes a lower portion 94 and an upper portion 96. The lower portion 92 has a slightly larger diameter than the upper portion 96, and has a smooth outer wall 98. The upper portion 94 has threading along its outer wall 100.

The other panels 46, 48 and 50 also have similarly formed cylindrical support members 110, 112 and 114, respectively, projecting from their respective top faces, except that the cylindrical support member 110 stands taller than the support members 90, 112 and 114. As will be explained in greater detail below, the cylindrical support members 90 and 110 provide points of attachment for the upper linkage mechanism 32 while the cylindrical support members 112 and 114 support provide points of attachment for the lower linkage mechanism 34.

Figure 4:
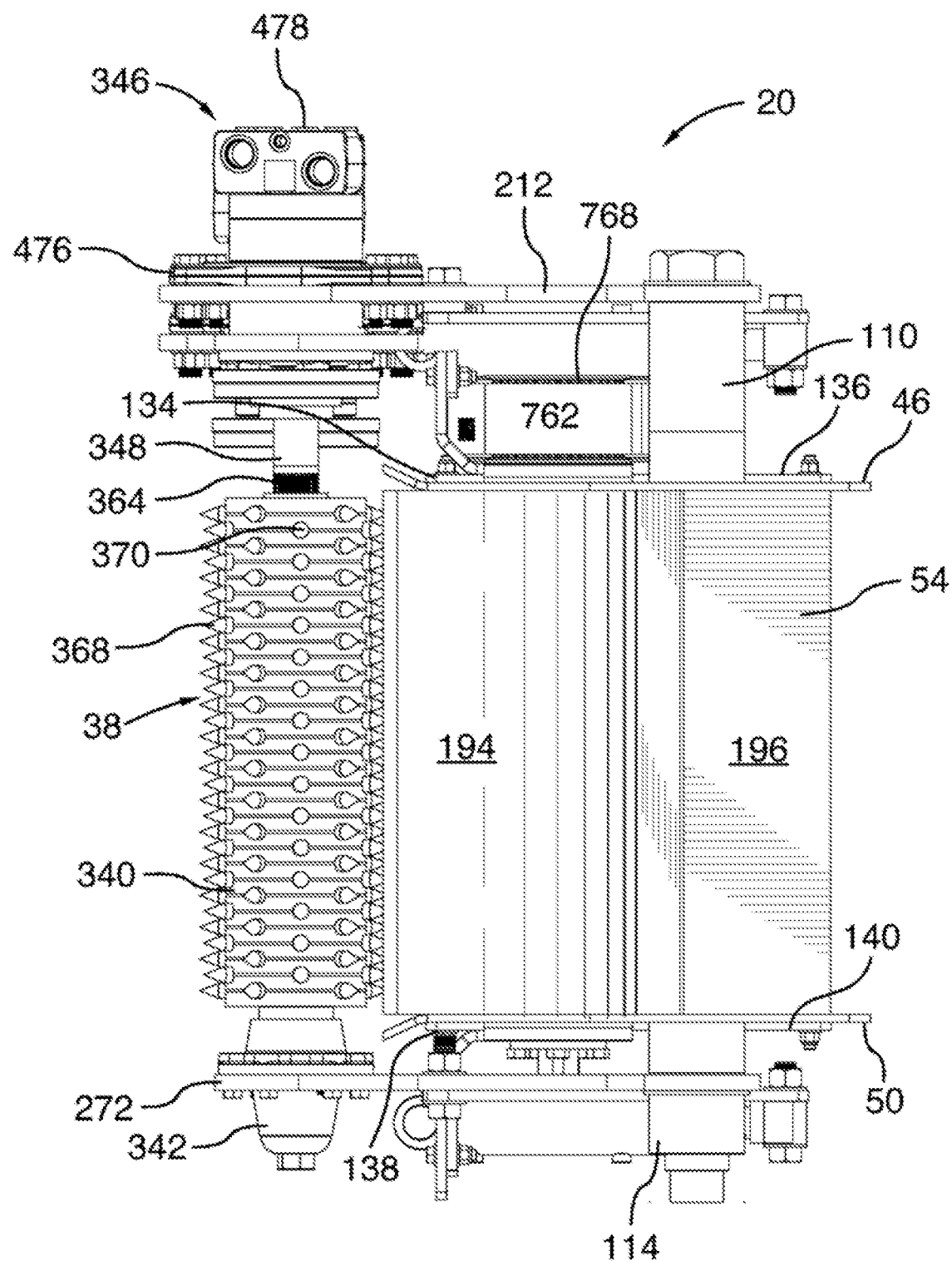
FIG. 4 is a right side elevation view of the brush chipper assembly of FIG. 1.
Figure 5:
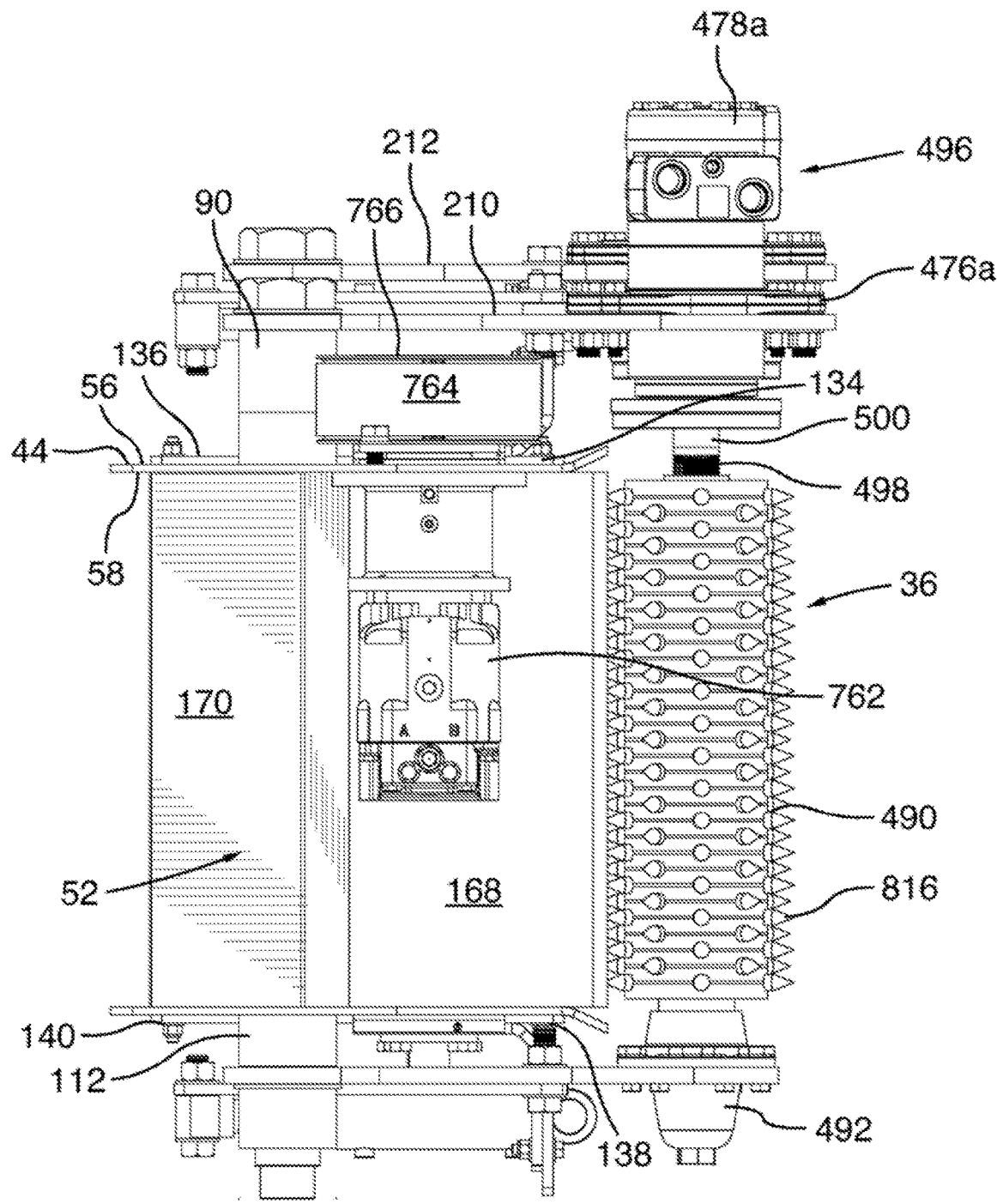
FIG. 5 is a left side elevation view of the brush chipper assembly of FIG. 1.

As best shown in FIGS. 4 and 5, the front edge 68 of the top left panel 44 is carried higher than the rear edge 74 thereof; the portion of the left top panel 44 adjacent the front edge 68 being upturned to form a top left deflector 120 for deflecting away chipping debris. The right top panel 46 is similarly formed with a top right deflector 122. In the case of the bottom left and right panels 48 and 50, the portion of these panels that are adjacent their respective front edges 124 and 126 are turned downwardly to form bottom left and right deflectors 128 and 130.

Adjacent the front left corner edge 70 of the top left panel 44, there is defined a relatively large circular aperture 132 sized to receive a portion of the drive assembly 40.

Plates 134 and 136 fastened to the top left and right panels 44 and 46 serve to connect the left and right sides of the frame 42. In a like arrangement, plates 138 and 140 are fastened to the bottom left and right panels 48 and 50 (see FIGS. 4 and 5).

Each of the top and bottom left panels 44 and 48 have a set of four apertures 142, 144, respectively, defined adjacent their respective left rear corner portions. The apertures 142 in panel 44 are aligned with the apertures 144 in panel 48. Both sets of apertures 142 and 144 are configured to receive fasteners for attaching a reinforcement post (not shown) between the panels 44 and 48. Similarly, each of the top and bottom right panels 46 and 50 have a set of four apertures 146, 148, respectively, defined adjacent their respective right rear corner portions. The apertures 146 in panel 46 are aligned with the apertures 148 in panel 50. Both sets of apertures 146 and 148 are configured to receive fasteners for attaching a reinforcement post (not shown) between the panels 46 and 50.

As best shown in FIGS. 9 and 11, the left sidewall member 52 resembles the right sidewall member 54—the one being the mirror image of the other, such that a description of the former will generally suffice for the latter. The sidewall member 52 has an upper edge 160, a lower edge 162, a front edge 164 and rear edge 166, and is formed with a curved portion 168 and a straight portion 170. The left sidewall member 52 extends vertically between the top and bottom left panels 44 and 48, and is welded along its upper edge 160 to the lower face 58 of the top left panel 44, and along its lower edge 162 to the upper face 174 of the bottom left panel 46. In the case of the right sidewall member 54, its upper edge 176 is welded to the lower face 178 of top right panel 46 and its lower edge 180 is welded to the upper face 182 of the bottom right panel 48.

The curved portion 168 of the left sidewall member 52 extends from the front edge 164 thereof to terminate at a transition section 184 located closer to the rear edge 166 than the front edge 164. The straight portion 170 of the left sidewall member 52 runs from the transition section 184 until the rear edge 166. The left sidewall member 52 is arranged diagonally between the front edges 68 and 124 of the top and bottom left panels 44 and 48 and the rear edges 74 and 192 thereof, with its curved portion 168 positioned opposite the left chipping head 36. Disposed in this fashion, the curved portion 168 defined as a protective well 193 for the left chipping head 36. The straight portion 170 of the left sidewall member 52 flares outwardly away from the curved portion 168 and operates to deflect wood chips and chipping debris.

The right sidewall member 54 is similarly formed with a curved portion 194 and a straight portion 196, and it extends diagonally between the front edges 198 and 126 of the top and bottom right panels 46 and 50 and the rear edges 200 and 202 thereof. The curved portion 194 of the right sidewall member 54 defines a protective well 195 for the right chipping head 38. The straight portion 196 of the right sidewall member 52 flares outwardly away from the curved portion 150.

Figure 6A:
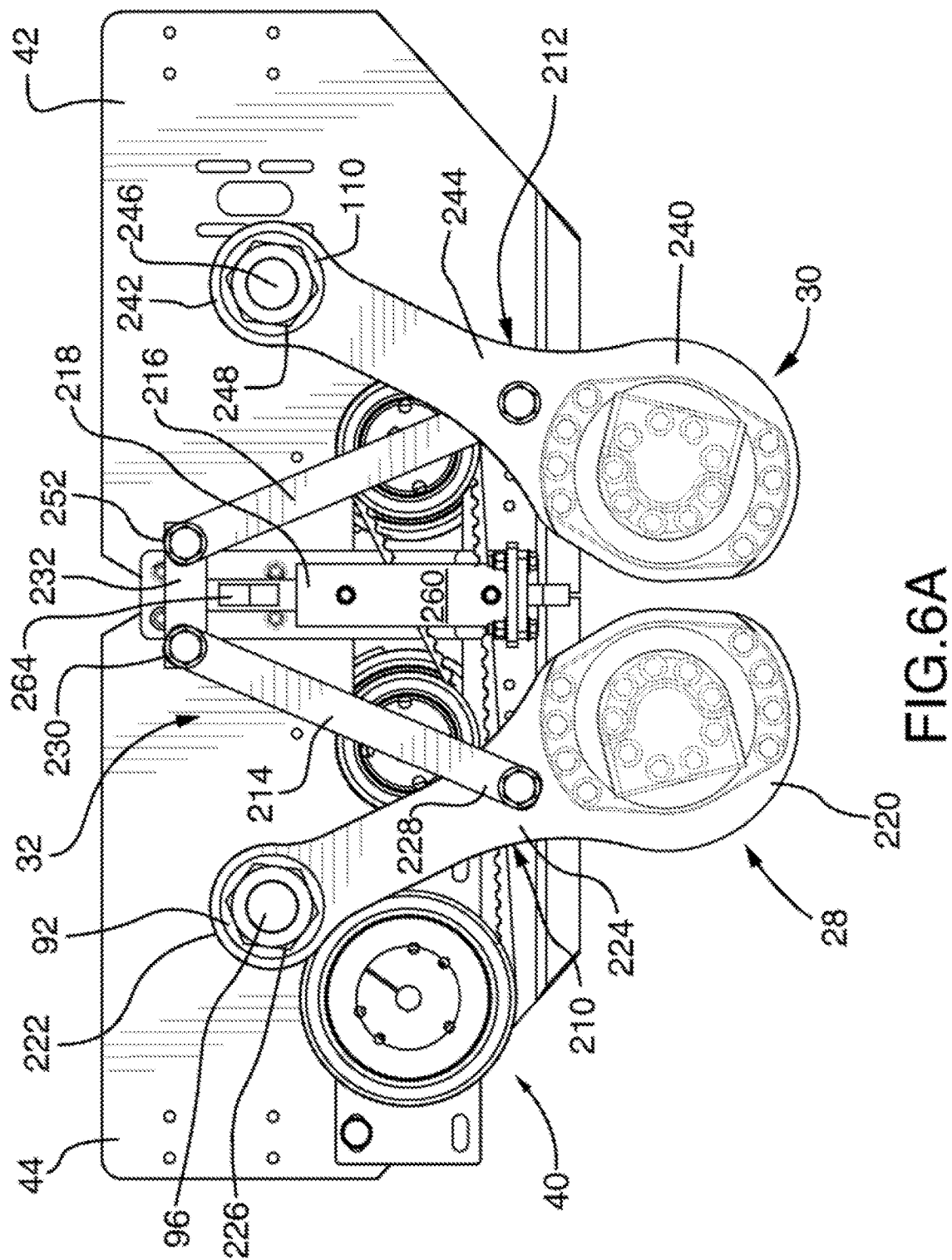
FIG. 6A is a top plan view of the brush chipper assembly of FIG. 2 showing the left and right feeder rollers of the feeder subassembly occupying respective first positions wherein a preset minimum gap exists between the left and right feeder rollers.

The components of the feeder subassembly 24 are now described in greater detail. Each feeder roller 28 and 30 is mounted between, and supported by, portions of the upper linkage mechanism 32 and the lower linkage mechanism 34. As shown in FIGS. 6A and 6B, the upper linkage mechanism 32 includes left and right primary linkage arms 210 and 212, left and right secondary linkage arms 214 and 216, and a hydraulic piston 218. The left and right primary linkage arms 210 and 212 connect the left and right feeder rollers 28 and 30, respectively, to the frame 42, while the left and right secondary linkage arms 214 and 216 tie the left and right primary linkage arms 210 and 212, respectively, to the hydraulic piston 218.

The left primary linkage arm 210 has an enlarged front end portion 220, a comparatively smaller rear end portion 222 and a tapered intermediate portion 224 joining the front and rear end portions 220 and 222 to each other. The front end portion 220 is carried forwardly of the front edge 68 of the top left panel 44. It has a relatively large aperture (not visible) formed therein sized to receive the upper portion of the left feeder roller 28. Defined in the front end portion 220 at locations surrounding the relatively large aperture, are bores (not shown) which are configured to receive therethrough bolts for attaching the left feeder roller 28 to the upper linkage mechanism 32.

The rear end portion 222 is also apertured and is configured to fit onto the short post 92 extending from the cylindrical support member 90. A nut 226 fastened on the threaded upper portion 96 of short post 92 retains the rear end portion 222 in place. When the upper linkage mechanism 32 is actuated, the rear end portion 222 can be made to pivot about the short post 92.

The left secondary linkage arm 214 has a front end 228 pivotally connected to the left primary linkage arm adjacent the front end portion 220, and a rear end 230 pivotally connected to a short bar 232 attached to the hydraulic piston 218. The front end 228 of the linkage arm 214 is attached to the top face of the tapered intermediate portion 224.

This arrangement of primary and secondary linkage arms is substantially reproduced on the right side of the upper linkage mechanism 32 with the right primary linkage arm 212 and the right secondary linkage arm 216. In like fashion to left primary linkage arm 210, the right primary linkage arm 212 has an enlarged front end portion 240, a comparatively smaller rear end portion 242 and a tapered intermediate portion 244 joining the front and rear end portions 240 and 242 to each other. The front end portion 240 is carried forwardly of the front edge of the top right panel 46. It has an aperture (not visible) formed therein sized to receive the upper portion of the right feeder roller 30. Defined in the front end portion 240 at locations surrounding the relatively large aperture, are bores (not shown) which are configured to receive therethrough bolts for attaching the right feeder roller 30 to the upper linkage mechanism 32.

The rear end portion 242 is also apertured and is configured to fit onto the short post 246 extending from the cylindrical support member 110. A nut 248 fastened on the threaded upper portion of the short post 246 retains the rear end portion 242 in place. When the upper linkage mechanism 32 is actuated, the rear end portion 242 is pivotable about the short post 246.

Figure 2:
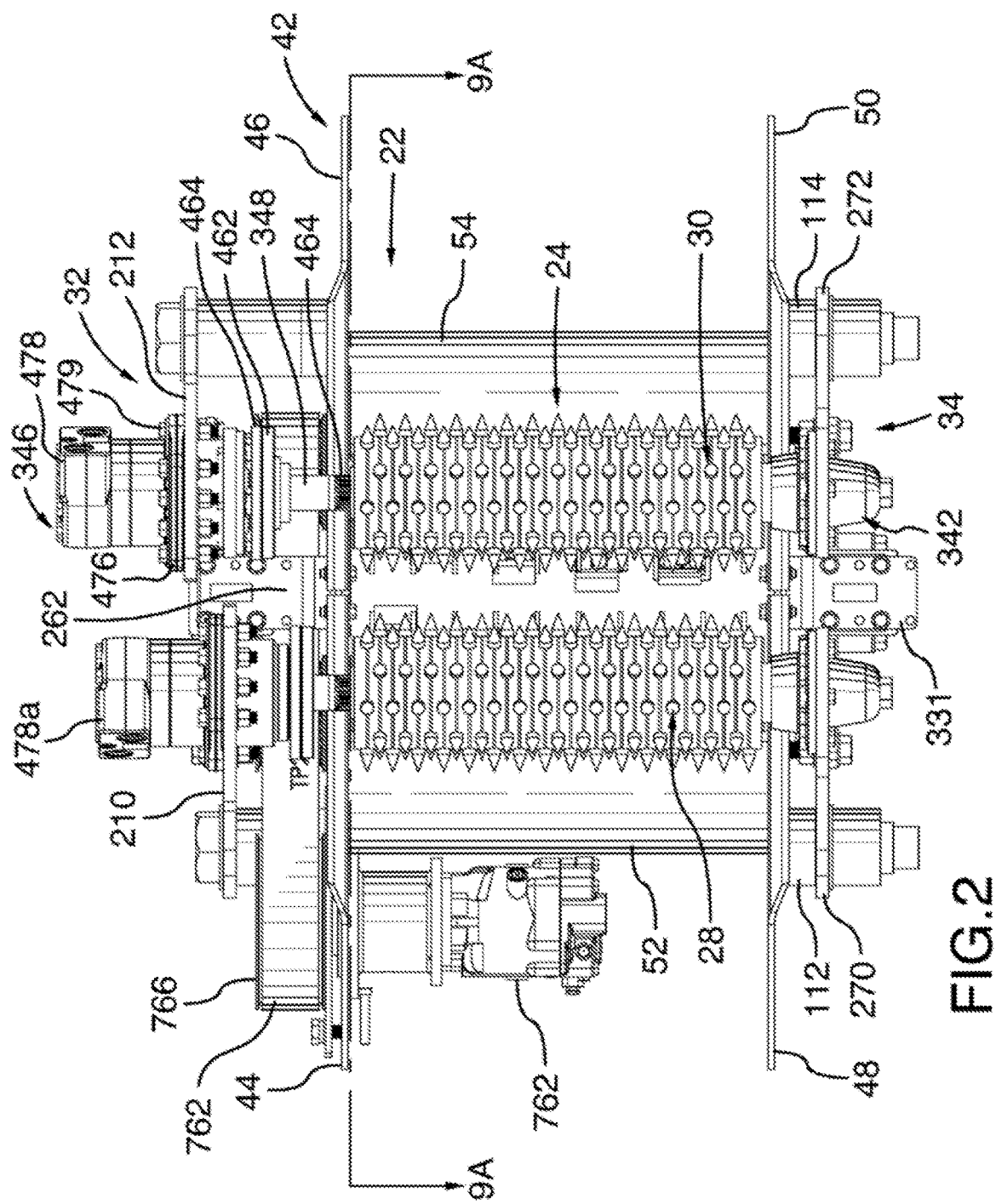
FIG. 2 is a front elevation view of the brush chipper assembly of FIG. 1 showing the left and right feeder rollers of the feeder subassembly.

As shown in FIG. 2, by reason of the difference in height between the cylindrical support members 90 and 110, the right primary linkage arm 212 is carried higher than the left primary linkage arm 210 relative to the top left and right panels 44 and 46. This prevents any physical interference from occurring between left feeder roller 28 and the right feeder roller 30, when the feeder rollers 28 and 30 are moved to their minimum spacing (see FIG. 6A).

The right secondary linkage arm 216 has a front end (not visible) pivotally connected to the right primary linkage arm 212 adjacent the front end portion 240, and a rear end 252 pivotally connected to the short bar 232. The front end 250 of the linkage arm 216 is attached to the bottom face of the tapered intermediate portion 244. The pivotal connection between the short bar 232 and the right secondary linkage arm 216 lies opposite the pivotal connection between the short bar 232 and the left secondary linkage arm 214.

The hydraulic piston 218 includes a hydraulic cylinder 260 which is fixed to the frame 42 by a bracket 262 (visible in FIG. 2), and a piston arm 264 operatively connected to the hydraulic cylinder 260. One end of the piston arm 264 is retained within the hydraulic cylinder 260 while the opposite end is fixed to the short bar 232. The piston arm 264 is moveable between a retracted position 266 shown in solid lines in FIG. 6B and an extended position 268 shown in FIG. 6A and in dashed lines in FIG. 6B. When the piston arm 264 is in its retracted position 266, the short bar 232 is disposed closest to the hydraulic cylinder 260 which causes the left and right secondary linkage members 214 and 216 to be splayed more widely for maximum spacing between the left feeder roller 28 and the right feeder roller 30. When the piston arm 264 is in its extended position 268, the short bar 232 is disposed furthest from the hydraulic cylinder 260 which causes the left and right secondary linkage members 214 and 216 to be brought closer together for minimum spacing between the left feeder roller 28 and the right feeder roller 30.

Figure 8:
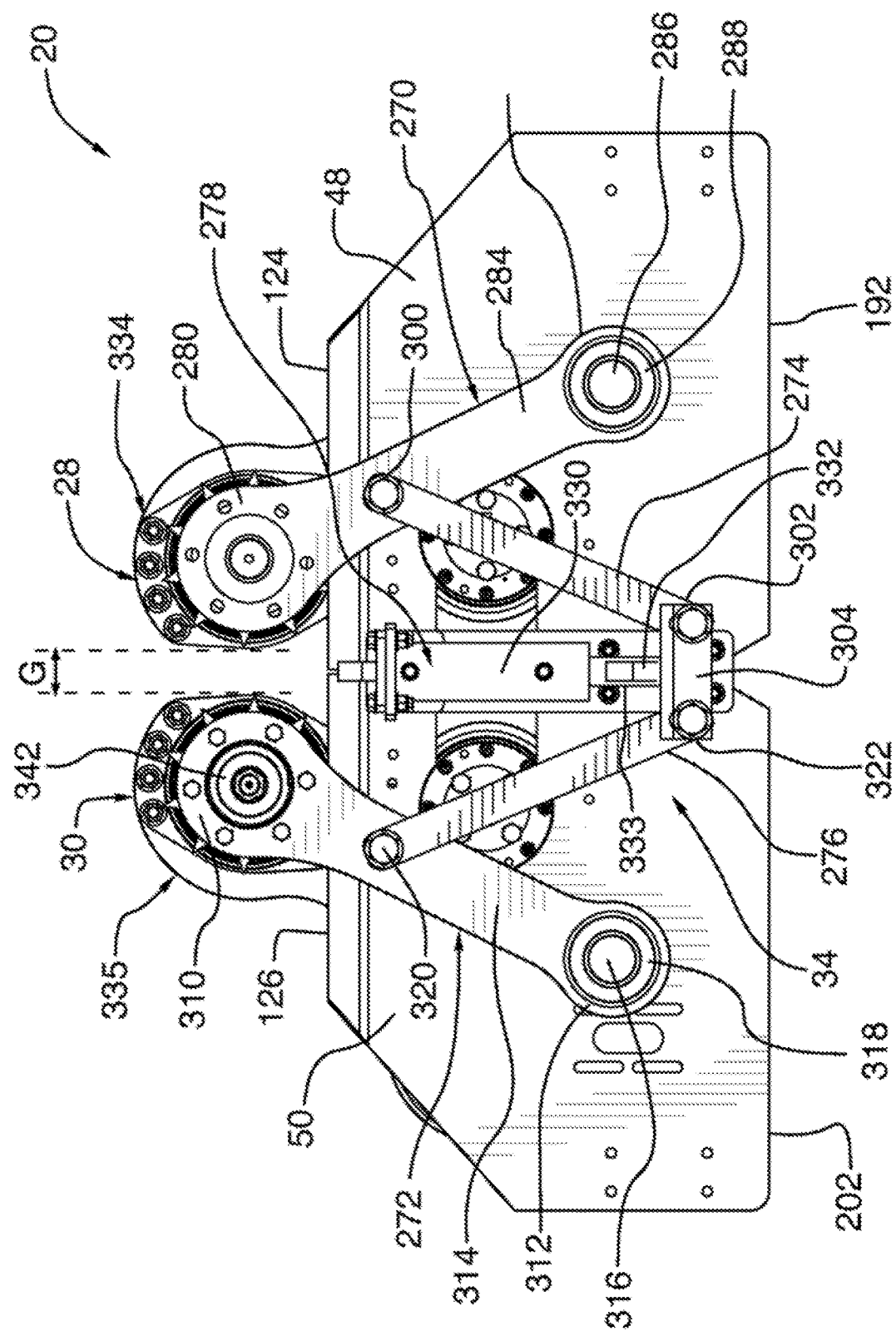
FIG. 8 is a bottom plan view of the brush chipper assembly of FIG. 2.

Turning now to the lower linkage mechanism 34 shown in FIG. 8, it can be seen to be generally similar to the upper linkage mechanism 32 in that it too has left and right primary linkage arms 270 and 272, left and right secondary linkage arms 274 and 276, and a hydraulic piston 278. The left and right primary linkage arms 270 and 272 connect the left and right feeder rollers 28 and 30, respectively, to the frame 42, while the left and right secondary linkage arms 274 and 276 tie the left and right primary linkage arms 270 and 272, respectively, to the hydraulic piston 278.

The left primary linkage arm 270 has an enlarged front end portion 280, a comparatively smaller rear end portion 282 and a tapered intermediate portion 284 joining the front and rear end portions 280 and 282 to each other. The front end portion 280 is carried forwardly of the front edge 124 of the bottom left panel 48. It has an aperture (not visible) formed therein sized to receive a bottom portion of the left feeder roller 28. Defined in the front end portion 280 at locations surrounding the relatively large aperture, are bores (not shown) which are configured to receive therethrough bolts for attaching the left feeder roller 28 to the lower linkage mechanism 34.

The rear end portion 282 is also apertured and is configured to fit onto the short post 286 extending from the cylindrical support member 112. A nut 288 fastened on the threaded upper portion of short post 286 retains the rear end portion 282 in place. When the lower linkage mechanism 34 is actuated, the rear end portion 282 can be made to pivot about the short post 286.

The left secondary linkage aim 274 has a front end 300 pivotally connected to the left primary linkage arm adjacent the front end portion 280, and a rear end 302 pivotally connected to a short bar 304 attached to the hydraulic piston 278. The front end 300 of the linkage arm 274 is attached to the bottom face of the tapered intermediate portion 284.

This arrangement of primary and secondary linkage arms is substantially reproduced on the right side of the lower linkage mechanism 34 with the right primary linkage arm 272 and the right secondary linkage arm 276. In like fashion to left primary linkage arm 270, the right primary linkage arm 272 has an enlarged front end portion 310, a comparatively smaller rear end portion 312 and a tapered intermediate portion 314 joining the front and rear end portions 310 and 312 to each other. The front end portion 310 is carried forwardly of the front edge 126 of the bottom left panel 50. It has an aperture (not visible) formed therein sized to receive the upper portion of the right feeder roller 30. Defined in the front end portion 310 at locations surrounding the relatively large aperture, are bores (not shown) which are configured to receive therethrough bolts for attaching the right feeder roller 30 to the lower linkage mechanism 34.

The rear end portion 312 is also apertured and is configured to fit onto the short post 316 extending from the cylindrical support member 114. A nut 318 fastened on the threaded upper portion of the short post 316 retains the rear end portion 312 in place. When the lower linkage mechanism 34 is actuated, the rear end portion 312 is pivotable about the short post 316.

The right secondary linkage arm 276 has a front end 320 pivotally connected to the right primary linkage arm 272 adjacent the front end portion 310, and a rear end 322 pivotally connected to the short bar 304. The front end 320 of the linkage arm 276 is attached to the bottom face of the tapered intermediate portion 314. The pivotal connection between the short bar 304 and the right secondary linkage arm 276 lies opposite the pivotal connection between the short bar 304 and the left secondary linkage arm 274.

The hydraulic piston 278 includes a hydraulic cylinder 330 which is fixed to the frame 42 by a bracket 331 (visible in FIG. 2), and a piston arm 332 operatively connected to the hydraulic cylinder 330. One end of the piston arm 332 is retained within the hydraulic cylinder 330 while the opposite end is fixed to the short bar 304. The piston arm 332 is moveable between a retracted position (not shown, but generally similar to retracted position 266 of the piston arm 264) and an extended position 333 shown in FIG. 8. When the piston arm 332 is in its retracted position, the short bar 304 is disposed closest to the hydraulic cylinder 330 which causes the left and right secondary linkage members 274 and 276 to be splayed more widely for maximum spacing between the left feeder roller 28 and the right feeder roller 30. When the piston arm 332 is in its extended position 333, the short bar 304 is disposed furthest from the hydraulic cylinder 330 which causes the left and right secondary linkage members 274 and 276 to be brought closer together for minimum spacing between the left feeder roller 28 and the right feeder roller 30.

It will thus be understood that when actuated the upper and lower linkage mechanisms 32 and 34 cooperate with each other to allow the left and right feeder rollers 28 and 30 to move from their respective first positions 334 and 335 (shown in FIG. 6A in solid lines and in FIG. 6B in dashed lines) to their respective second positions 336 and 337 (shown in FIG. 6B in solid lines). When the left and right feeder rollers 28 and 30 are in their respective first positions 334 and 335, the gap G that is defined between the outer boundaries of the left and right feeder rollers 28 and 30, is at its smallest size. In contrast, when the left and right feeder rollers 28 and 30 are in their respective second positions 334 and 335, the gap G is at largest size. Accordingly, the gap U can be adjusted to accommodate the diameter or width of the branch or other feedstock to be reduced to chips by actuating the upper and lower linkage mechanisms 32 and 34. In this embodiment, the gap G when at its smallest size measures ⅛ in., sufficient to prevent physical interference between the feeder rollers. It will be appreciated that the gap G shown in FIG. 6B, is exaggerated somewhat for the purposes of illustration. The diameter or width of the branch or feedstock will be less than the gap G when at its largest size.

In this embodiment, the linkage arms and pistons in each mechanism 32 and 34 are arranged so that the left feeder roller 28 and the right feeder roller 30 are biased in their respective first positions 334 and 335 in order to maintain the gap G at its smallest size. In order to widen the gap G (i.e. move the feeder rollers 28 and 30 away from each other toward their respective second positions 336 and 337), it is necessary to overcome the biasing force of the upper and lower linkage mechanisms 32 and 34. As explained in greater detail below, this is achieved by applying a force against the left and right feeder rollers 28 and 30, which force is generated by a branch or other feedstock as it travels through the feeder subassembly 24.

It should also be appreciated that the biasing action of the upper and lower linkage mechanisms 32 and 34 tends to enhance the gripping action of the feeder rollers 28 and 30 and their ability to securely hold the branch or other feedstock in place while it is conveyed to the chipping subassembly 26. Moreover, it serves to properly align the branch or other feedstock between the left and right chipping heads 36 and 38.

Figure 12A:
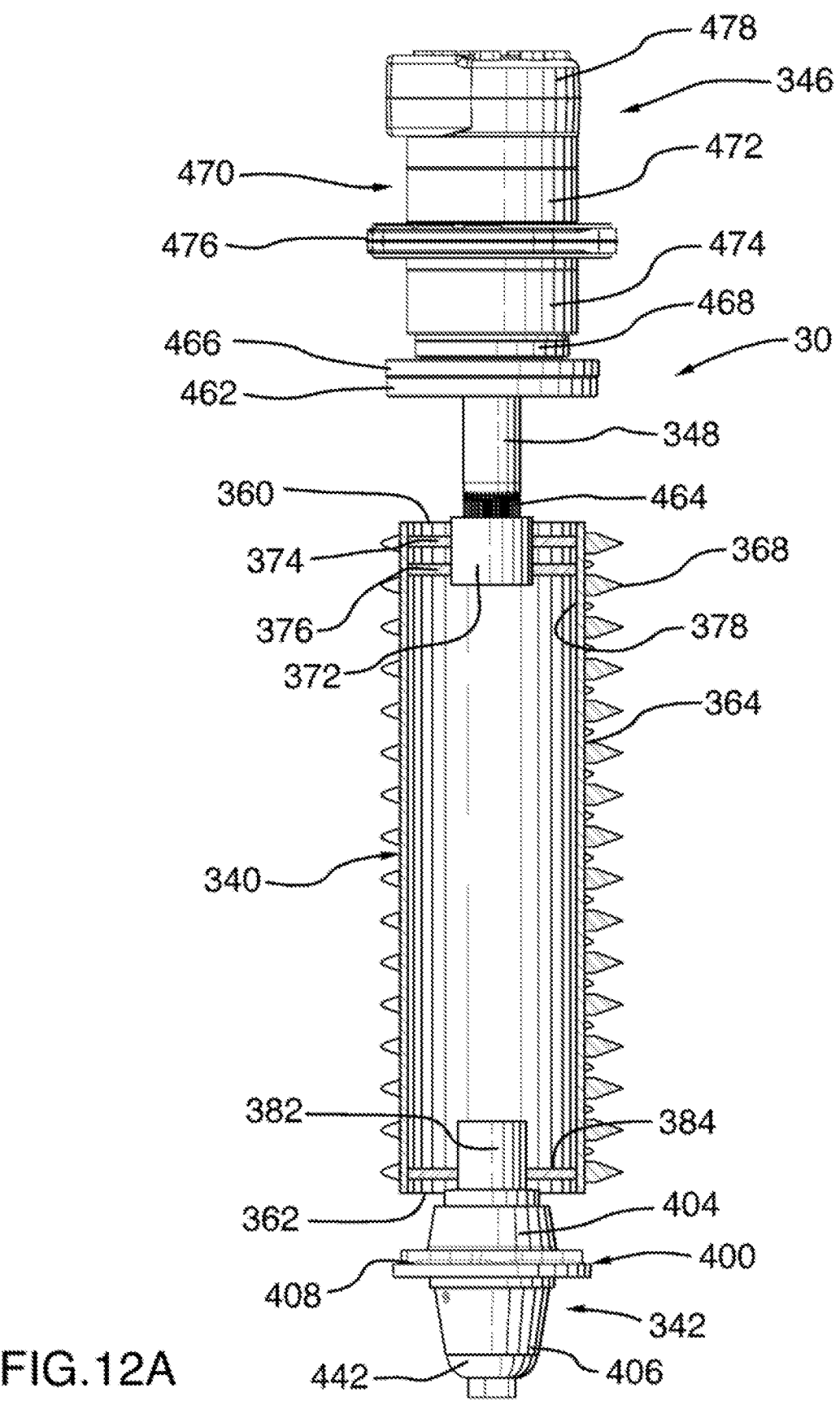
FIG. 12A is an isolated side elevation view of the right feeder roller illustrated in FIG. 4, with a portion of the roller body removed to reveal details of the interior thereof.
Figure 12B:
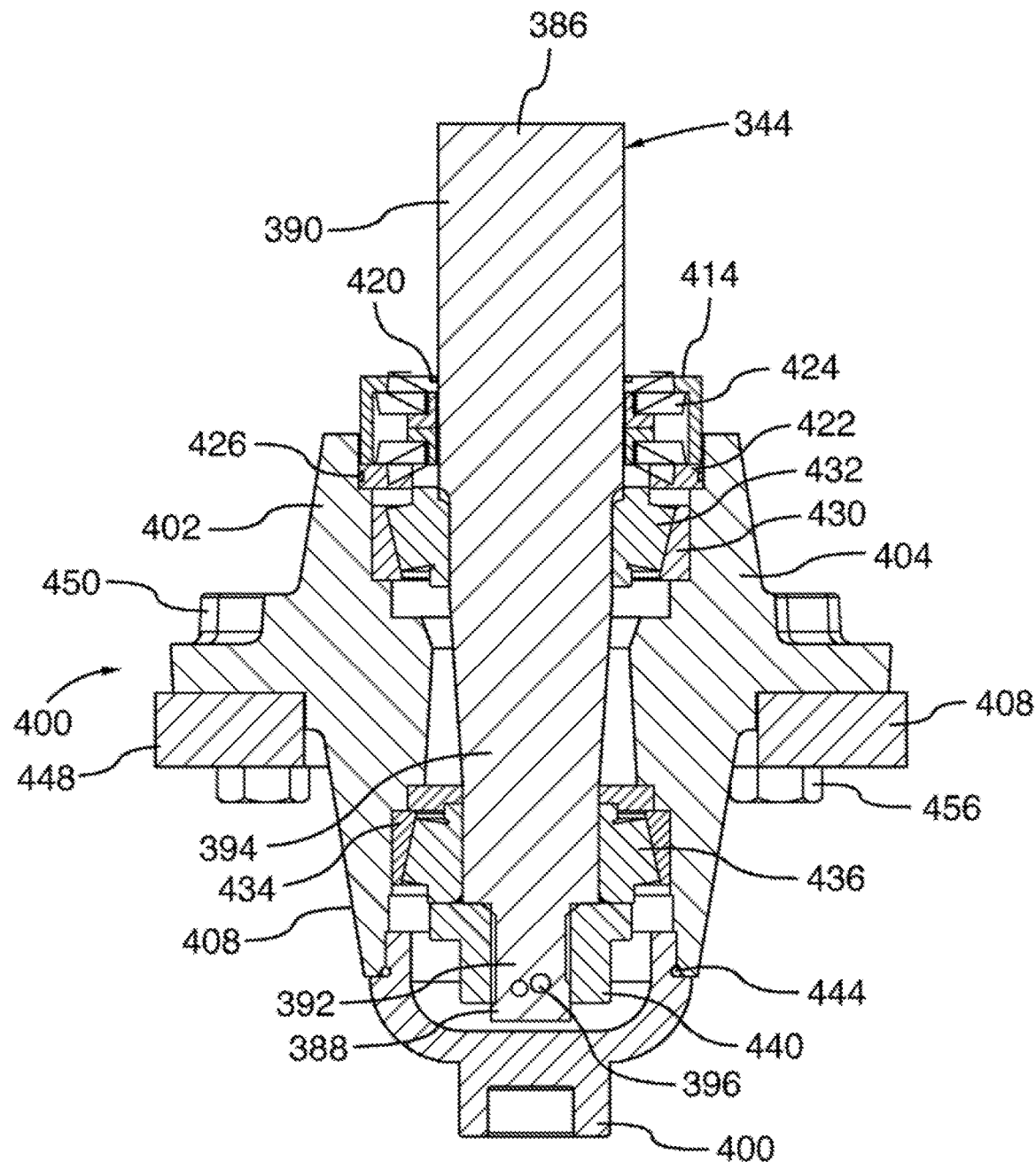
FIG. 12B is an isolated cross-sectional view of the bottom bearing support and the bottom shaft of the right feeder roller shown in FIG. 12A.
Figure 12C:
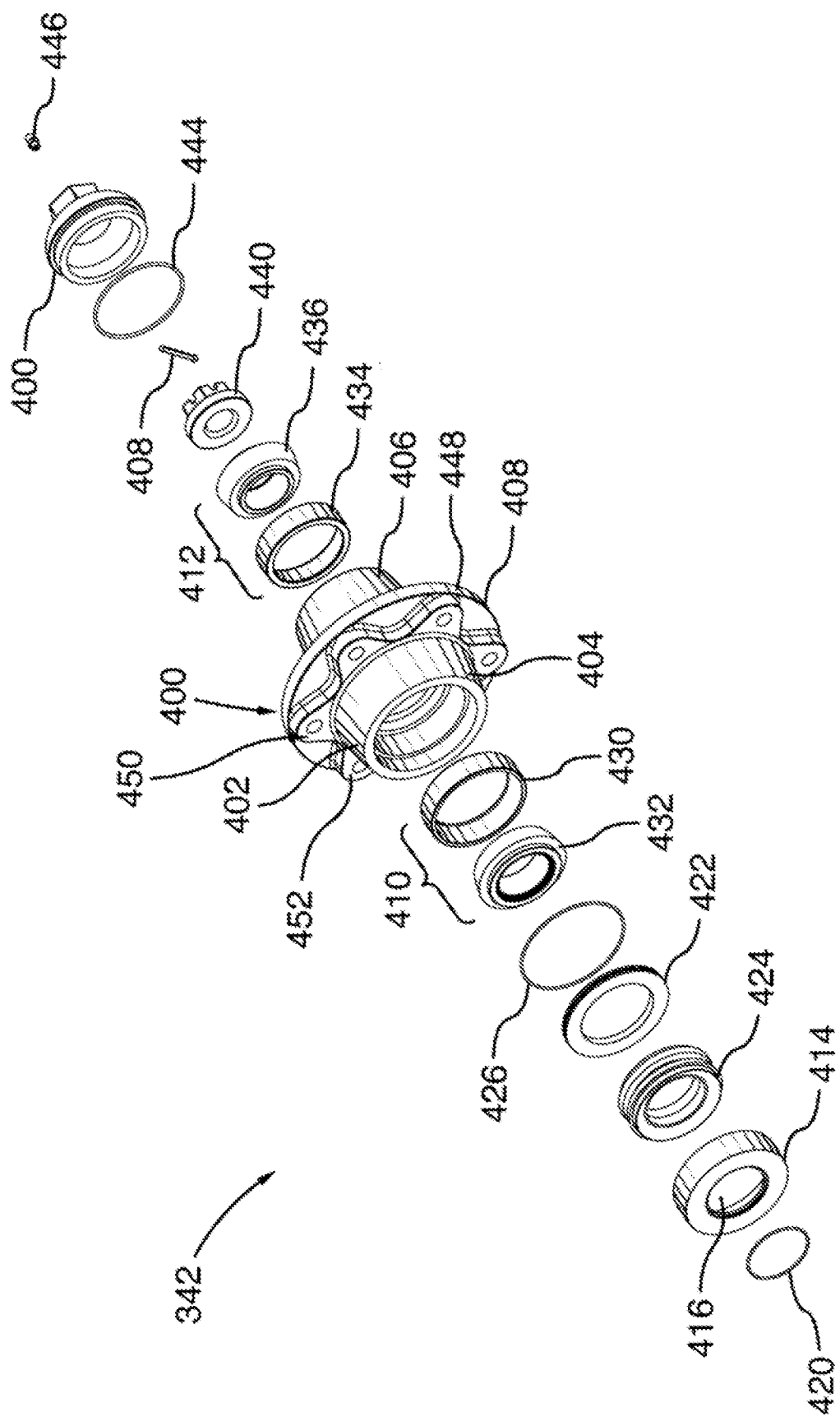
FIG. 12C is an exploded view of the bottom bearing support shown in FIG. 12B.

Turning now to the right feeder roller 30, a description thereof follows with reference to FIGS. 12A to 12C. The right feeder roller 30 includes a roller body 340, a bottom bearing support 342, a bottom shaft 344 fixed to the roller body 340 for connecting the bottom bearing support 342 to the roller body 340, a drive block 346 and a top shaft 348 for transmitting the torque generated by the drive block 346 to the roller body 340.

The roller body 340 has a hollow cylindrical structure having a top end 360, a bottom end 362 and a sidewall 364 extending between the top and bottom ends 360 and 362. In this embodiment, the diameter of the roller body is 14 inches. In other embodiments, the diameter of the roller body could be sized differently.

The outer surface 366 of the sidewall 364 carries a plurality of spaced apart, conical tips or spikes 368 which are adapted to penetrate the tree branch or feedstock and grip it to allow it to be drawn into the brush chipper assembly 20. The spikes 368 are arranged along a number of rows 370. In this embodiment, there are ten (10) rows 370 of spikes 368 evenly-spaced about the outer surface 366 (see FIG. 9A). These rows 370 alternate between having fifteen (15) or sixteen (16) spikes 368 each. The spikes 368 of any given row 370 are longitudinally offset from the spikes 368 of the next adjacent row for enhanced coverage along the outer surface 366. In other embodiments, the spikes could be laid out along a different arrangement.

Fixed at the top end 360 and extending into the hollow of the roller body 340 is the top splined socket 372. It is welded to a pair of spaced apart annular plates 374 and 376 whose respective outer edges are themselves welded to the inner surface 378 of the sidewall 364. The top socket 372 is configured for mating engagement with one end of the top shaft 348.

The bottom end 362 of the roller body 340 is also provided with a socket 382 (however, it is not splined), which is held in place by a single annular plate 384. In like fashion to the outer plates 374 and 376, the outer edge of the annular plate 384 is welded to the inner surface 378 of the sidewall 364. In this case, the bottom socket 382 receives the first end 386 of the bottom shaft 344, which component is welded in place.

As shown in FIG. 12B, the bottom shaft 344 includes a second end 388 disposed opposite the first end 386, a first shaft portion 390 extending from the first end 386, a second shaft portion 392 extending from the second end 388 and a third shaft portion 394 located between the first and second portions 390 and 392. Adjacent the second end 388, the second shaft portion 392 has a transverse bore 396 defined therethrough.

The diameter of the first shaft portion 390 remains constant throughout its length. In contrast, the diameter of the third shaft portion 394 tapers along a section of its length in the direction of the second end 388. Lastly, the second shaft portion 392 has a diameter that is smaller than the diameters of the first and third shaft portions 390 and 394.

Referring now FIGS. 12B and 12C, the bottom support bearing 342 includes a hub 400 defined by a sidewall 402. The hub 400 is formed with a top hub portion 404, a bottom hub portion 406 and an intermediate flange portion 408 disposed between the top and bottom hub portions 404 and 406. The top hub portion 404 accommodates a first bearing assembly 410 while the bottom hub portion 406 receives a second bearing assembly 412. The top hub portion 404 is partially closed off by a flanged mud extruder 414 provided with a central aperture 416. Surrounding the central aperture 416 is a small rebate in which is seated a first O-ring gasket 420. The flanges of the mud extruder 414, on the one hand, and a back-up washer 422, on the other hand, together define a space which accommodates a mechanical seal 424. A second O-ring gasket 426 is disposed between the back-up washer 422 and the sidewall 402 of the top hub portion 404. The flanged mud extruder 414, the first O-ring gasket 420, the back-up washer 422 and the mechanical seal 424 are all configured to fit snugly around the first shaft portion 390 so as to prevent dust and debris from penetrating into the top hub portion 404 and gumming up the first bearing assembly 410.

In this embodiment, the first bearing assembly 410 is a cup and cone bearing. It includes a cup or outer ring 430 and a cone or inner ring 432 in abutting engagement with the outer ring 430. The inner ring 432 is sized to receive a section of the third shaft portion 394. The outer ring 430 sits between the inner surface of the hub sidewall 402 and the inner ring 432.

The second bearing assembly 412 is similar to the first bearing assembly 410 in that it too is a cup and cone bearing having an outer ring 434 and inner ring 436. However, the outer and inner rings 434 and 436 are sized smaller than the outer and inner rings 430 and 432 because the second bearing assembly 412 accommodates a section of the third shaft portion 394 that has a smaller diameter than that of the shaft section received in the first bearing assembly 410. Also, the outer and inner rings 434 and 436 are disposed in a mirror image arrangement (along a notional horizontal line not shown running through the intermediate flange portion 408) to the outer and inner s 430 and 432 of the first bearing assembly 410.

A castle nut 440 is provided for retaining the second bearing assembly 412 in place within the bottom hub portion 406. The castle nut 406 is sized to fit on the second shaft portion 392 and in conjunction with a cotter pin 408, fixedly retain the shaft 344. A hub cap 442 is attached to the hub 400 to close off the bottom hub portion 406. Disposed between the hub cap 442 and the hub 400 is an O-ring gasket 444. A grease fitting 446 is incorporated into the hub cap to lubricate the second bearing assembly 412.

The intermediate flange portion 408 is formed with a thick collar 448 from which a six-lobed, star-shaped, projection 450 stands proud. Each lobe 452 of the projection 450 has an aperture 454 defined therein that extends right through the collar 448. Each aperture 454 is configured to receive a bolt 456 therethrough for securing the hub 400 to the right primary linkage arm 272 of the lower linkage mechanism 34. When the right feeder roller 30 is operatively connected to the lower flange mechanism 32, the bottom hub portion 406 is received through the aperture defined in front end portion 310 of the lower right primary linkage arm 272, and the collar 448 rests upon and is supported by the front end portion 310.

As shown in FIGS. 1 and 12A, the top shaft 348 has a cylindrical shaft portion 460 that terminates with a mounting plate 462. The end 464 of the shaft portion 460 opposite the mounting plate 462 is splined for mating engagement with the top socket 372. The mounting plate 462 has a plurality of bores (not visible) defined therein which are alignable with corresponding bores (not visible) defined in the mounting plate 466 of a drive shaft 468 (which forms part of the drive block 346) to allow bolts to be inserted therethrough to securely fasten the drive shaft 468 to the top shaft 348.

The drive block 346 includes a housing 470 having top and bottom portions 472 and 474 that meet at an intermediate flanged section 476, a hydraulic motor 478 accommodated within the housing 470, and a drive shaft 468 operatively connected to the motor 478. The intermediate flange section 476 of the housing 470 has a plurality of bores (not visible) which are alignable with the bores defined in the right primary linkage arm 212 of the upper linkage mechanism 32, and which are configured to receive bolts 479 therethrough to fixedly secure the drive block 346 to the upper linkage mechanism 32. When the right feeder roller 30 is operatively connected to the upper flange mechanism 32, the bottom housing portion 474 is received through the aperture defined in front end portion 240 of the upper right primary linkage arm 212, and the flanged section 476 rests upon and is supported by the front end portion 240. It will thus be appreciated the right feeder roller 30 is held in place by the upper right primary linkage arm 212 of the upper linkage mechanism 32 and the lower right primary linkage arm 272 of the lower linkage mechanism 34, with the drive block 346 being substantially supported by the upper right primary linkage arm 212.

The mounting plate 466 of the drive shaft 468 protrudes from the bottom housing portion 472. It is of a size to match the mounting plate 466 of the top shaft 348. When the motor 478 is actuated, the drive shaft 468 is urged to rotate and, by reason of the fixed connection between the mounting plates 466 and 462, is able to transmit torque to the top shaft 348 (and ultimately, to the roller body 340).

While it is preferred that the motor 476 be hydraulically-powered, it will be appreciated that this need not be the case in every application. In other embodiments, other motors may be used to similar advantage, for instance, pneumatically-powered motors or gas-powered motors.

Referring to FIGS. 1, 2 and 4, it can be seen that the left feeder roller 28 is generally similar to the right feeder roller 30 in that it too includes a roller body 490, a bottom bearing support 492, a bottom shaft (not visible) fixed to the roller body 490 for connecting the bottom bearing support 492 to the roller body 490, a drive block 496 and a top shaft 498 for transmitting the torque generated by the drive block 496 to the roller body 490. The structure of the components 490, 492, 496 and 498 of the left feeder roller 28, their function and their arrangement relative to each other, are generally similar to those of corresponding components 340, 342, 346 and 348 of the right feeder roller 30, such the description of the former will generally suffice for the latter, except that in the case of the top shaft 498, its cylindrical shaft portion 500 is shorter than the cylindrical shaft portion 462 of the top shaft 348. In like fashion to the right feeder roller 30, the left feeder roller 28 is held in place by the upper left primary linkage arm 210 of the upper linkage mechanism 32 and the lower left primary linkage arm 270 of the lower linkage mechanism 34, with the drive block 496 being substantially supported by the upper left primary linkage arm 210.

With reference to FIGS. 3, 7A, 7B, 13A to 13C, the components of the chipping subassembly 26 are now described in greater detail. Each chipping head 36 and 38 is mounted for rotation within the housing 22. The left chipping head 36 is positioned within the well 193 and extends substantially between the top left panel 44 and the bottom left panel 48. In the case of right chipping head 38, it is disposed within the well 195 and extends substantially between the top right panel 46 and the bottom right panel 50. As explained in greater detail below, the upper portion of each head 36, 38 protrudes from the top of the housing 22 to be operatively connected to the drive assembly 40.

The left and right chipping heads 36 and 38 are similar to each other in all material respects such that a description of one (i.e. the right chipping head 38) will suffice for the other (i.e. the left chipping head 36). However, where appropriate, specific reference may be made to one or more components of the left chipping head 36, it being understood that such components resemble corresponding components of the right chipping head 38 described below such that no further description is required. In such cases, the components of the left chipping head 36 shall be identified with same reference numerals as used for like components of the right chipping head 38, except that all reference numerals designating components of the left chipping head 36 shall also include the suffix "a".

Figure 13A:
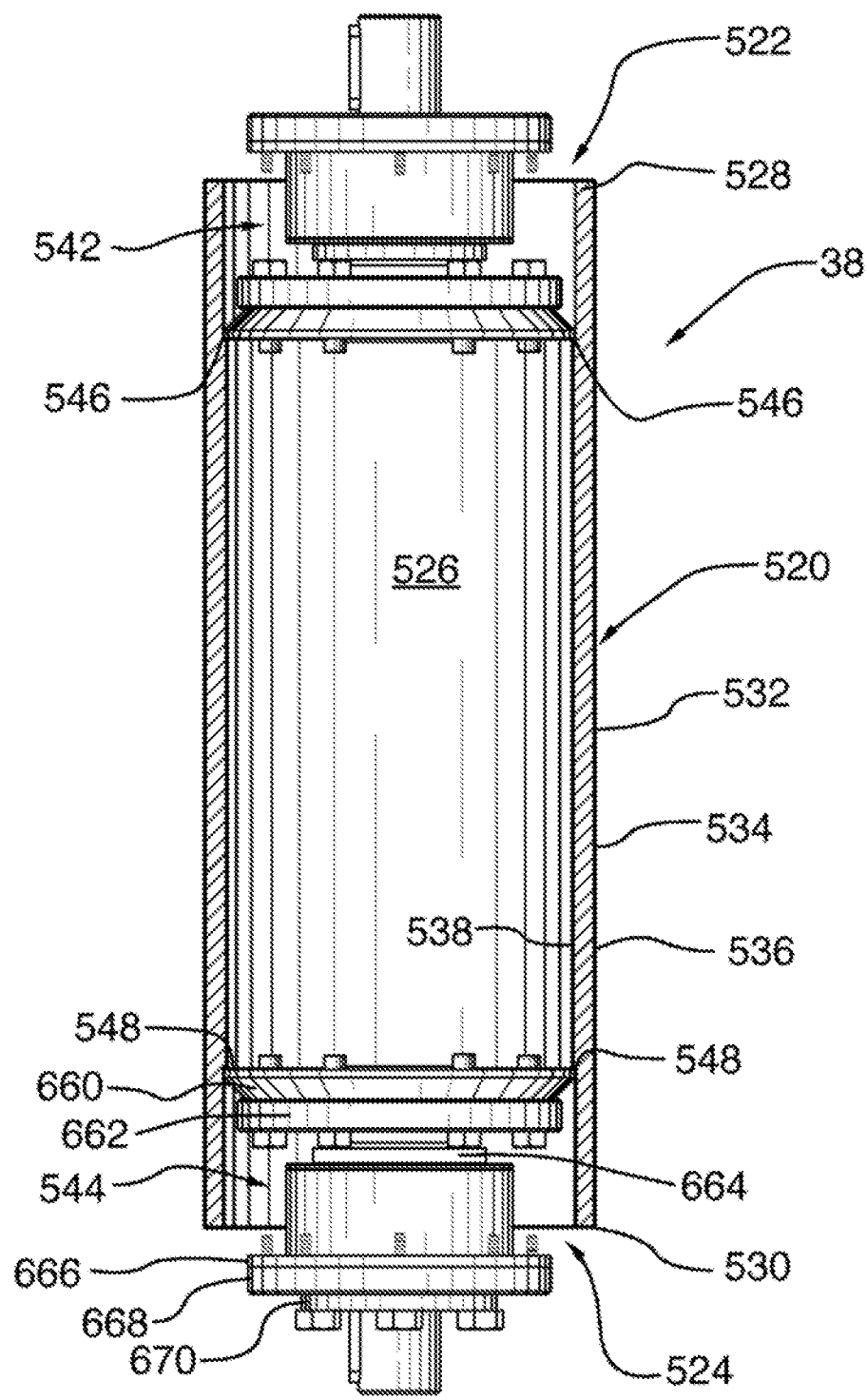
FIG. 13A is an isolated side elevation view of the right chipping head illustrated in FIG. 3, with collars, cutting tooth assemblies and a portion of the support body removed to reveal details of the interior of the support body, including the arrangement of upper and lower coupling assemblies within the hollow of the support body.
Figure 13B:
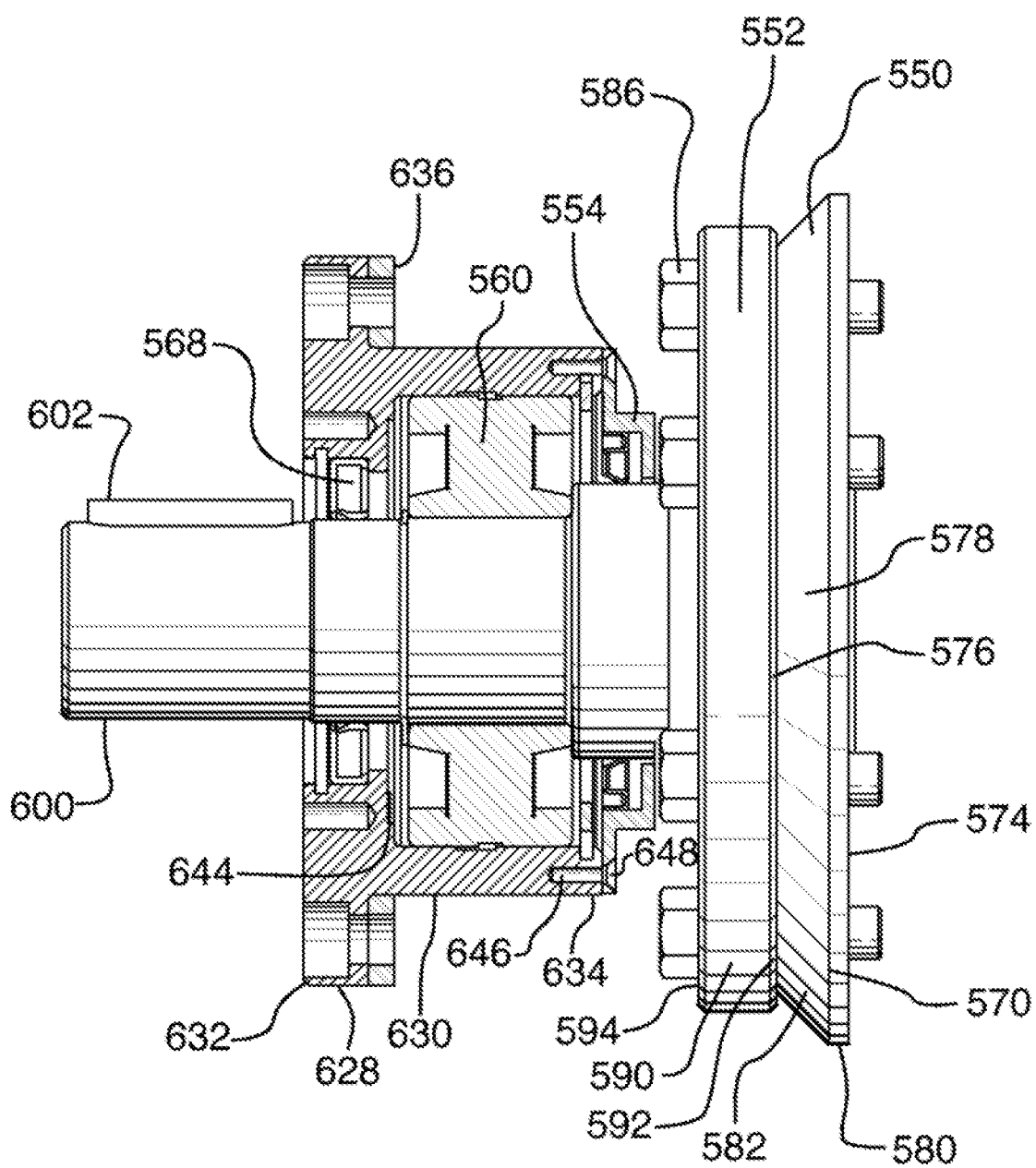
FIG. 13B is an isolated cross-sectional view of the upper coupling assembly of the right chipping head shown in FIG. 13A.
Figure 13C:
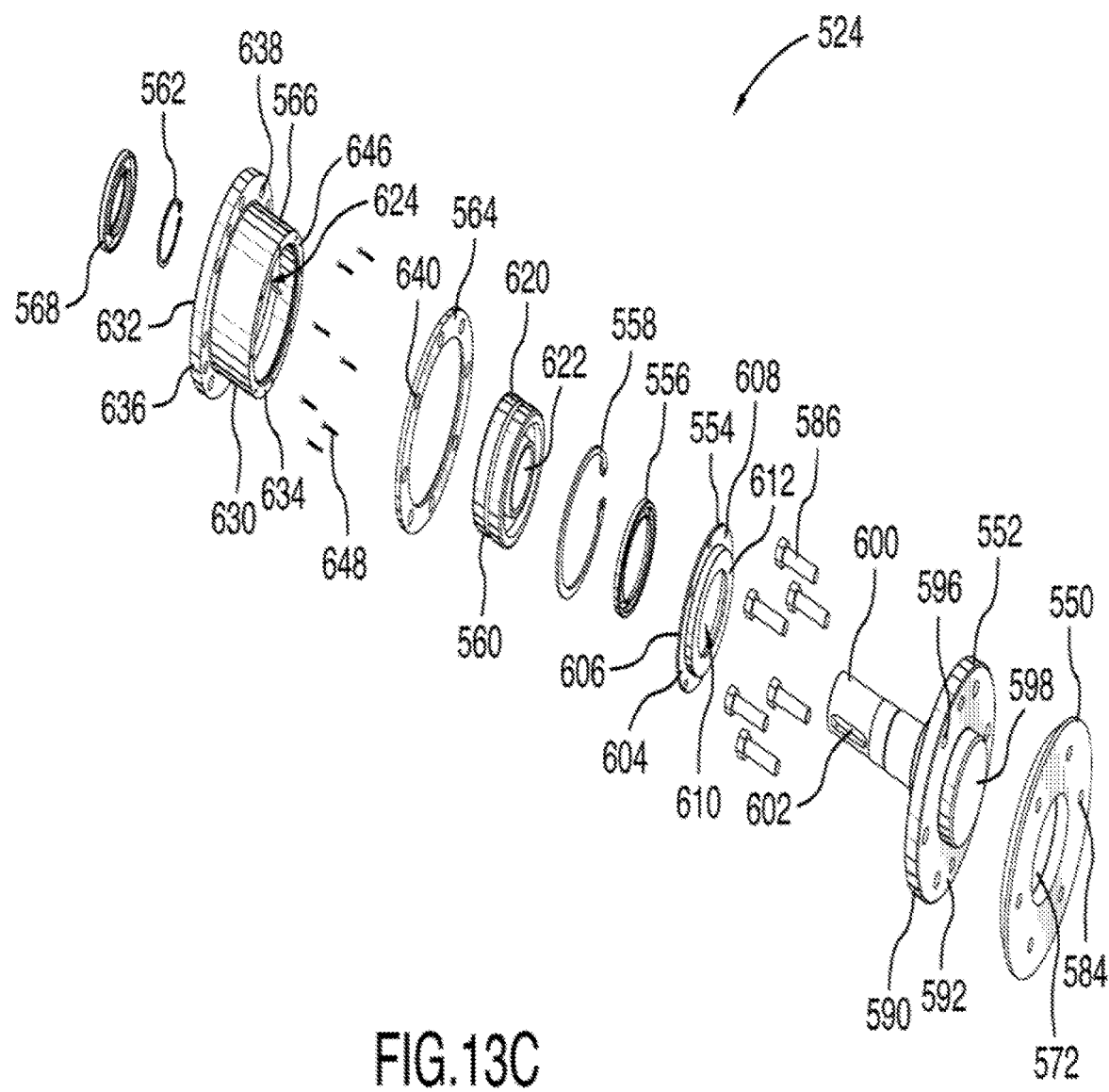
FIG. 13C is an exploded view of the upper coupling assembly shown in FIG. 13B.
Figure 14:
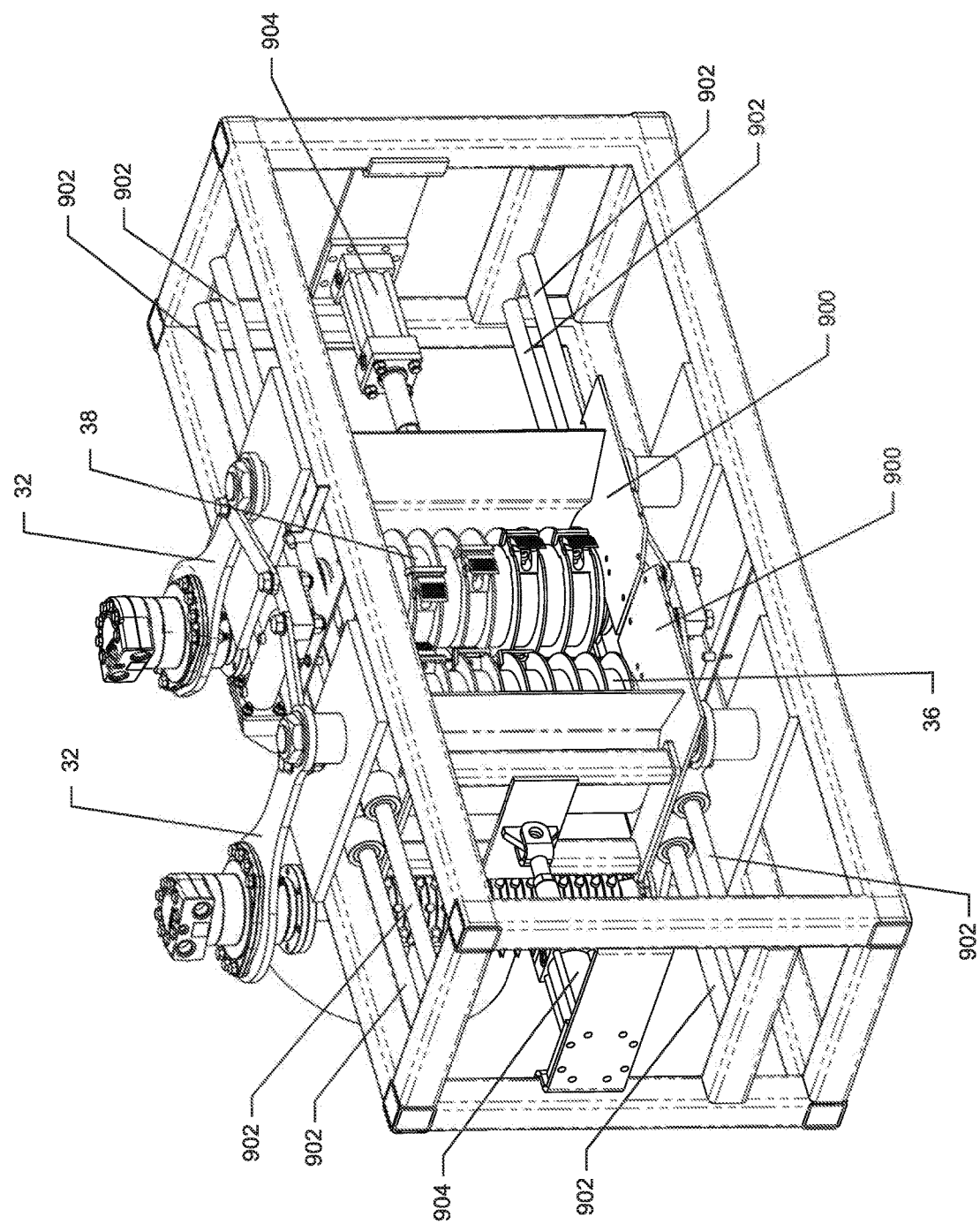
FIG. 14 is a perspective view of another embodiment of a brush chipper assembly wherein the feeder rollers and the chipping heads move inwardly and outwardly for accommodating varying sizes of logs and branches.
Figure 15:
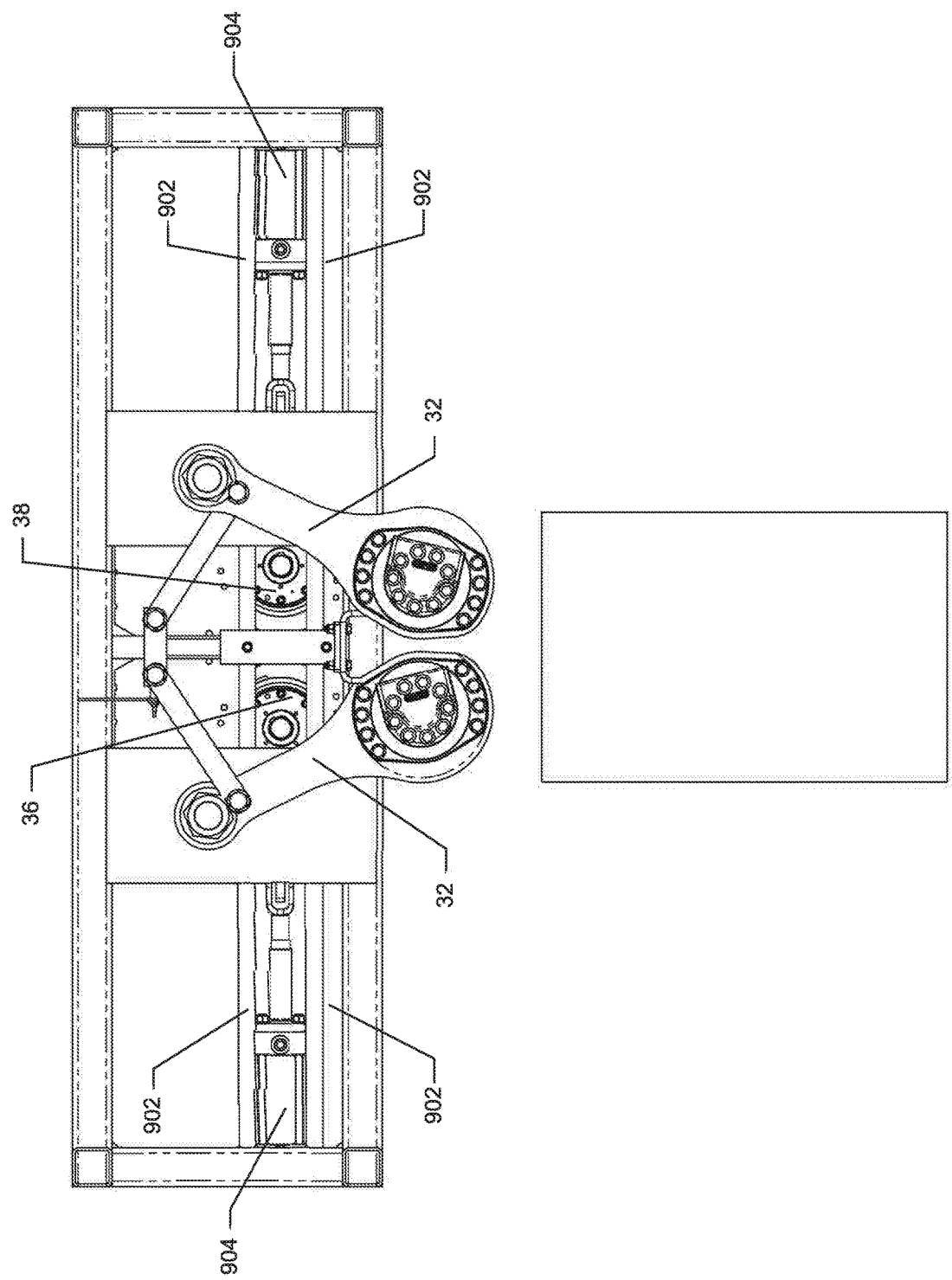
FIG. 15A is a top view of the embodiment of a brush chipper assembly shown in FIG. 14, wherein the feeder rollers and chipping heads are biased to inward positions.
FIG. 15B is a top view of the embodiment of a brush chipper assembly shown in FIG. 14, wherein the feeder rollers and chipping heads are positioned in outward positions to accommodate a branch of large diameter.
FIG. 15C is a top view of the embodiment of a brush chipper assembly shown in FIG. 14, wherein the feeder rollers are disposed in an outward position, while the chipping heads are disposed in an inward position.
Figure 15:
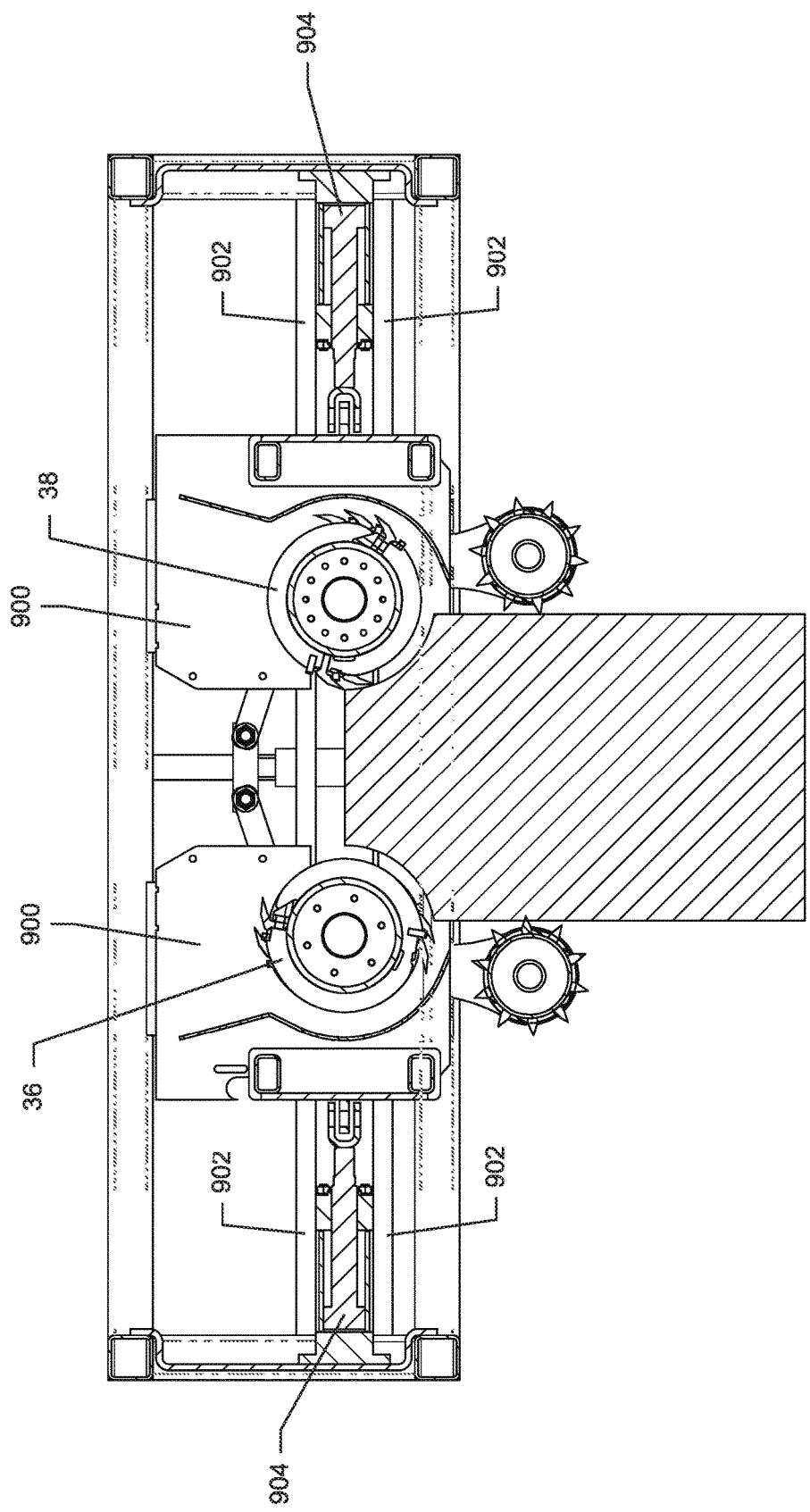
Figure 15:
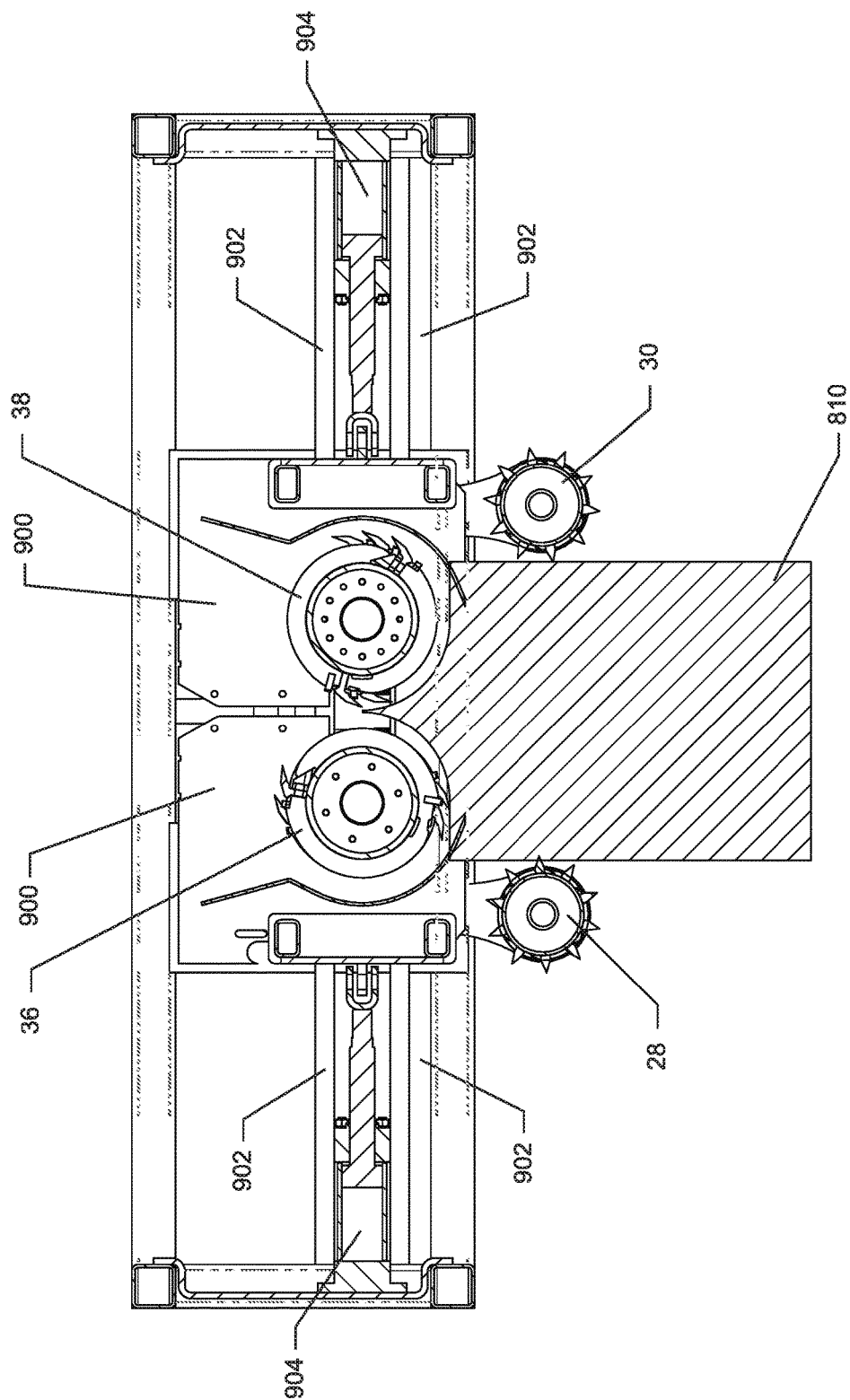

FIGS. 13A to 13C show the right chipping head 38 and components thereof. The right chipping head 38 includes a tubular support body 520, and upper and lower coupling assemblies 522 and 524 housed substantially within the hollow 526 defined in the support body 520. The support body 520 has an upper end 528, a lower end 530 and an intermediate portion 532 extending between the upper and lower ends 528 and 530. In this embodiment, the support body 520 is cylindrical; its circular cross-section defined by a circumferential wall 534 having an outer surface 536 and an inner surface 538. As explained in greater detail below, the outer surface 536 carries a plurality of protective collars 539 mounted concentrically to the support body 520 at spaced intervals along the intermediate portion 532, and a plurality of cutting tooth assemblies 540—each cutting tooth assembly 540 being nestled between an adjacent pair of collars 539.

The thickness of the circumferential wall 534 is not constant throughout the length of the support body 530. More specifically, the circumferential wall 534 is thinner at the regions 542 and 544 of the support body 520 (which regions extend inwardly from the upper and lower ends 528 and 530 a short distance) than at the mid-length of the support body 210. In the regions 542 and 544 the hollow 526 has a greater cross-sectional area to accommodate the upper and lower coupling assemblies 522 and 524. Defined by the increased thickness of the circumferential wall 534 beyond the regions 542 and 544, are circumferentially extending shoulders 546 and 548 upon which portions of the upper and lower coupling assemblies 522 and 524 will abut. As shown in FIG. 13A, the upper coupling assembly 522 is adapted to fit within the hollow 526 in region 542, while the lower coupling assembly 524 is designed to fit in the hollow 526 in region 544.

Referring now to FIGS. 13B and 13C, there is shown the upper coupling assembly 522 which includes a mounting plate 550 for fixing to the support body 520, a coupling member 552, a flanged annular member 554, a first annular sealing gasket 556, a first retaining ring 558, a bearing assembly 560, a second retaining ring 562, a mounting ring 564, a bearing support member 566 and a second annular sealing gasket 568.

The mounting plate 550 has an annular body 570 with a central aperture 572, a first face 574 and a second opposed face 576. The first face 574 is joined to the second face 576 by a sidewall 578 formed by a narrow circumferential band 580 and a tapering sidewall portion 582. When mounting the plate 550 to the support body 520, the peripheral edge of the first face 574 is urged to abut the circumferential shoulder 546 of the support body 520. The narrow band 580 is brought to bear against the inner surface 538 of the support body 520 and the mounting plate 550 is welded to the support body 520 about its tapering sidewall portion 582. Defined in the mounting plate 550 is a plurality of bores 584 sized to accommodate fasteners in the nature of threaded fasteners 586.

The coupling member 552 includes a disc-shaped portion 590 having a first face 592, a second face 594 and a plurality of circumferentially spaced bores 596 defined therein extending between the first and second faces 592 and 594. Standing proud of the first face 592 is a puck-like projection 598 that is sized for clearance fit with the central aperture 572 formed in the mounting plate 550. During fabrication, the first face 592 of the coupling member 552 is brought to bear against the second face 576 of the mounting plate 550 with the puck-like projection 598 locating in the central aperture 572. Thereafter, the coupling member 552 is fastened to the mounting plate 550 by inserting the fasteners 586 into the aligned the bores 584 and 596 and tightening them. The coupling member 552 further includes a cylindrical portion 600 that extends outwardly from the second face 594. The cylindrical portion 600 has a keying projection 602 for mating engagement with a portion of the drive assembly 40.

The flanged annular member 554 is defined at least partially by a sidewall 604. A first circumferential lip or flange 606 extends outwardly from the edge of the sidewall 604. The first flange 606 has defined therein a plurality of circumferentially spaced apertures 608. Radially bounding the central aperture 610 formed in the flanged member 554 is a second, inwardly projecting flange 612. The second flange 612 forms a seat for the first sealing gasket 556. When the upper coupling assembly 522 is assembled, the flanged annular member 554 surrounds the cylindrical portion 600 and the first gasket 556 tends to form a seal between the flanged annular member 554 and the cylindrical portion 600 to prevent dust or debris from fouling the lubricant that coats the bearings (not shown) of the bearing assembly 560.

The second gasket 568 disposed at the opposite end of the bearing assembly 560 and mounted between the bearing assembly 560 and an inwardly extending flange 644 of the bearing support member 566, serves a similar sealing function. Again, while it is generally preferred that gaskets 556 and 568 be employed, in alternative embodiments these gaskets may be omitted.

The bearing assembly 560 includes a generally annular body 620 having a central aperture 622 defined therethrough. Within the hollow 624 of the bearing support member 566, the annular body 620 is securely retained at one end by the second retaining ring 562 mounted in surrounding relation with the cylindrical portion 600 and at the opposite end by the first retaining ring 558 which engages the inner surface of the sidewall 628 of the bearing support assembly 558. Housed within the annular body 620 is a plurality of bearings (not shown) disposed circumferentially about the central aperture 622. When the upper coupling assembly 522 is assembled, the bearing assembly 560 surrounds the cylindrical portion 620 and allows free rotation of the coupling member 552 relative to the bearing support member 566. The bearing assembly 560 uses roller bearings.

The bearing support member 566 has a generally tubular body 630 having a first end 632, a second end 634 and sidewall 628 extending between the first and second ends 632 and 634. Extending outwardly from the edge of the sidewall 628 at the first end 632 is a first circumferential lip or flange 636. The first flange 636 has defined therein a plurality of circumferentially spaced apertures 638 which are alignable with apertures 640 defined in the mounting ring 564 and apertures 642 formed in the top right panel 46. At its first end 632, the tubular body 630 also has second, inwardly projecting flange 644 that radially bounds the hollow 624 in the tubular body 630. When the upper coupling assembly 522 is assembled, the second gasket 568 sits on the cylindrical portion 600 and abuts the inner face of the second flange 644. A plurality of longitudinal bores 646 drilled into the sidewall 628 at the second end 634 are alignable with the apertures 608 defined in the first flange 606 of the flanged annular member 554. During fabrication, threaded fasteners 648 are inserted through bores 646 and 608 and tightened to attach the bearing support member 558 to the flanged annular member 554.

Turning now to the lower coupling assembly 524, it is similar in all material respects to the upper coupling assembly 522 in that the former includes the same components as the latter, arranged in the same manner, with the exception that the lower coupling assembly 524 includes one additional component described below. In common with the upper coupling assembly 522, the lower coupling assembly 524 includes a mounting plate 660 for fixing to the support body 520, a coupling member 662, a flanged annular member 664, a first annular sealing gasket (not visible), a first retaining ring (not visible), a bearing assembly (not visible), a second retaining ring (not visible), a mounting ring 666, a bearing support member 668 and a second annular sealing gasket (not visible). However, the lower coupling assembly 524 further includes an annular end plate 670 for mounting to the lower end of bearing support member 558 to close off the hollow therein. But for the annular end plate 670, the upper and lower coupling assemblies 522 and 524 could be said to be a mirror image one of the other disposed at opposite regions 542 and 544 of the support body 520. Components 660, 662, 664, 666, 668, 670 are visible in FIG. 13A.

FIGS. 3, 9A, 9B and 10 show the arrangement of collars 539 and cutting tooth assemblies 540 along the support body 520. This arrangement will be known to those skilled in the art as a substantially similar arrangement is described in U.S. Pat. No. 7,980,278 of Labbe et al. incorporated herein by reference. Accordingly, for the purposes of this description, it will suffice to describe this arrangement only very broadly.

Figure 9B:
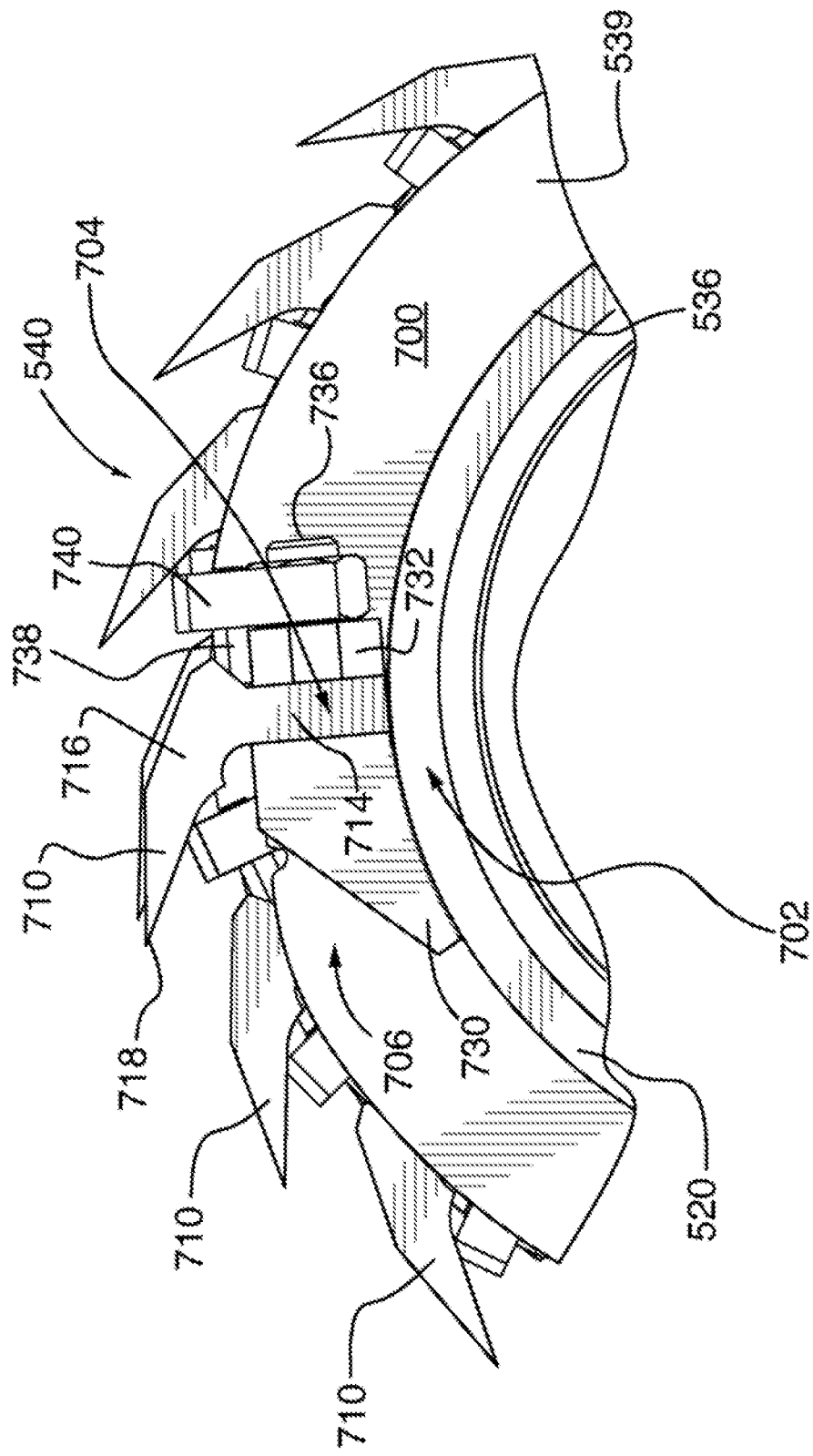
FIG. 9B is an enlarged end view of the encircled portion "9B" of the brush chipper assembly illustrated in FIG. 9A showing a cutting tooth assembly of the right chipping head.

Each collar 539 has a substantially penannular structure defined by a relatively flat, circumferentially extending, sidewall 700 formed with a cutout 702 (see FIG. 9B). Each collar 539 is radially mounted to the support body 520 with its inner sidewall edge welded to the outer surface 536 of the support body 520. The spacing between adjacent collars 539 is sized to correspond generally to the width of the cutting tooth assembly 540. Each collar 539 is radially offset from its adjacent collar 539 such that the cutouts 700 of adjacent collars are staggered relative to each other. In this embodiment, a station 704 is defined between each cutout 700 formed in a given collar 539 and that portion of each sidewall 700 of an adjacent collar 539 that is disposed opposite such cutout 700. Each station 704 is sized to accommodate therein a portion of a cutting tooth assembly 540.

The cutting tooth assembly 540 includes a cutting tooth 710 and a mounting assembly 712 for securely fixing the cutting tooth 540 within a respective station 704. The cutting tooth 710 has a base portion 714 and a cutting portion 716 which extends from the base portion 714 in a generally canted fashion. The cutting tooth portion 716 has a tapering, wedge-like, profile that terminates in a cutting edge 718. When the cutting tooth 710 is mounted within the station 704, the cutting edge 718 extends beyond the outermost edges of sidewalls 700 of adjacent collars 539. During actuation of the right chipping head 38, the cutting edge 718 tends to be the first element of the cutting tooth 540 to make contact with the feedstock.

The mounting assembly 706 includes a mounting block 730 disposed forwardly of the cutting tooth 540, a mounting plate 732 disposed rearwardly of the cutting tooth 590, a fastener in the nature of a nut 734 and bolt 736 (visible in FIG. 3) for securing the cutting tooth 590 to the mounting block 730 and the mounting plate 732, an abutment plate 738 supported on the outer edges of adjacent collars 539 and bearing against a portion of the cutting tooth 710, and a C-shaped retaining member 740.

Having described the various components of the chipping heads 36 and 38, the arrangement of these chipping heads within the frame 42 is now explained in greater detail with reference to FIGS. 3, 4 and 5. During fabrication of the brush chipper assembly 20, before the left and right side of the frame 42 are fastened to each other, the right chipping head 38 is positioned between the top and bottom right panels 46 and 50 within the well 193, with its longitudinal axis generally aligned with the rebates 82 and 86 defined in the panels 46 and 50. At the upper end of the right chipping head 38, the mounting ring 564 abuts the top right panel 46 and is sandwiched between the latter and the bearing support member 566 (see FIGS. 3 and 4). Similarly, at the lower end of the right chipping head 38, the mounting ring 666 abuts the bottom right panel 50 and is sandwiched between the latter and the bearing support member 668. Thereafter, the upper and lower ends of the right chipping head 38 are fastened to the frame 42. More specifically, at the upper end of the right chipping head 38, fasteners (not visible) are inserted through the aligned apertures 638, 640 and 642 of the bearing support member 566, the mounting ring 564 and the top right panel 46, and secured. In like fashion, at the lower end of the right chipping head 38, fasteners (not visible) are inserted through the aligned apertures of the bearing support member 668, the mounting ring 666 and the bottom panel 50, and secured.

The left chipping head 36 is similarly arranged within the frame 42 between the top and bottom left panels 44 and 48 within the well 195, with its longitudinal axis generally aligned with the rebates 80 and 84 defined in the panels 44 and 48, except that, as best seen in FIGS. 9 and 10, the left chipping head 36 is oriented so as to be the mirror image of the right chipping head 38. Arranging the left chipping head 36 in this manner ensures that cutting teeth 540a carried on the support body 520 are properly oriented so that their respective cutting edges 718a contact the feedstock first when the left chipping head 36 is rotated in the clockwise direction.

Figure 3:
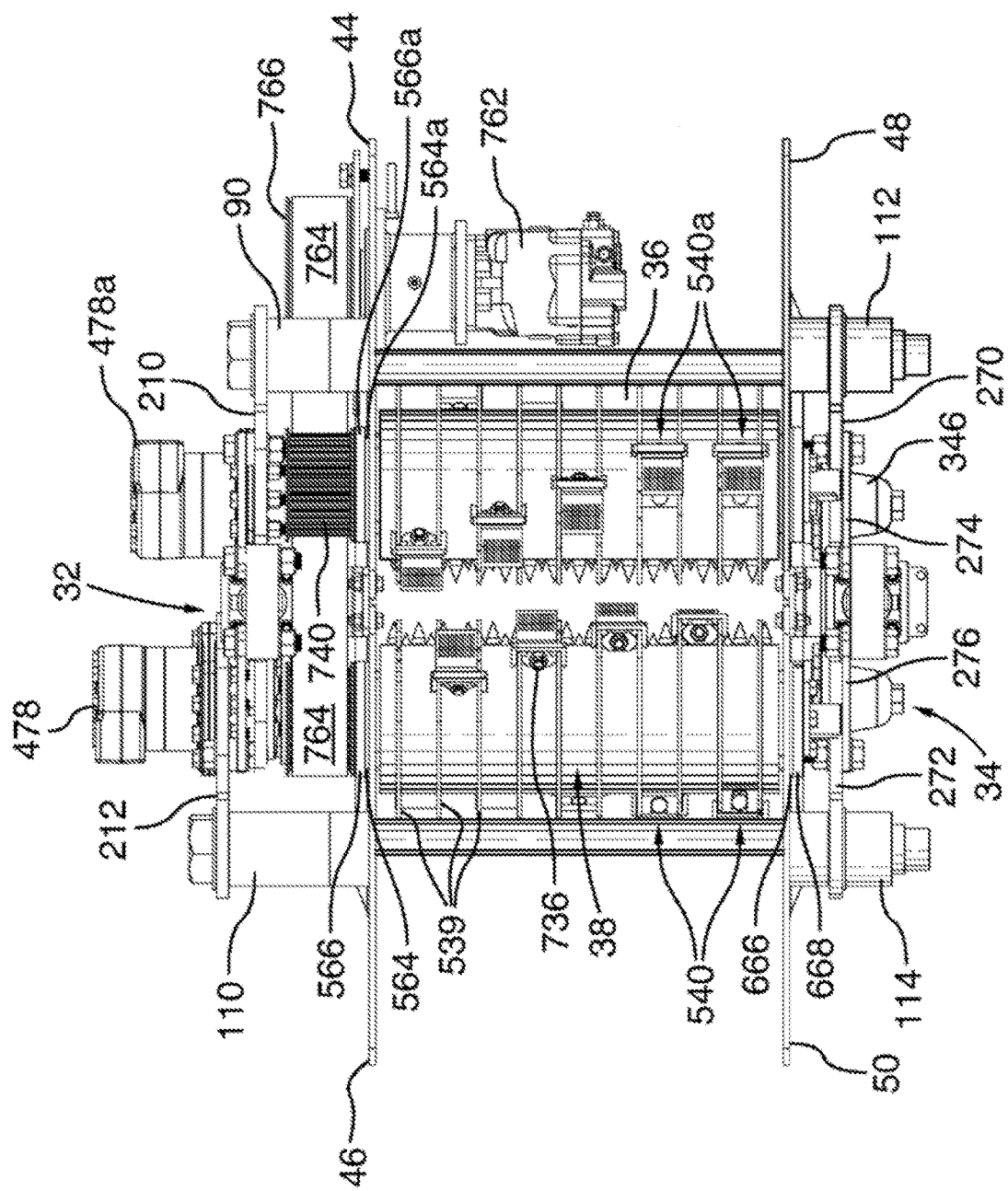
FIG. 3 is a rear elevation view of the brush chipper assembly of FIG. 1 with a portion of the housing of the brush chipper assembly removed to details of the left and right chipping heads of the chipping subassembly.

At the upper end of the left chipping head 36, the mounting ring 564a abuts the top left panel 44 and is sandwiched between the latter and the bearing support member 566a (see FIGS. 3 and 5). Similarly, at the lower end of the left chipping end 36, the mounting ring 666 abuts the bottom left panel 48 and is sandwiched between the latter and the bearing support member 668a. Thereafter, the upper and lower ends of the left chipping head 36 are fastened to the frame 42 in like fashion to the manner of the upper and lower ends of the right chipping head 38.

In this embodiment, the spacing S between the chipping heads 36 and 38 as measured between the outermost margin or envelope of each chipping head is ⅛ in. a space sufficient to prevent physical interference between the chipping heads. The spacing S, shown in FIG. 9, is exaggerated somewhat for the purposes of illustration.

Figure 7A:
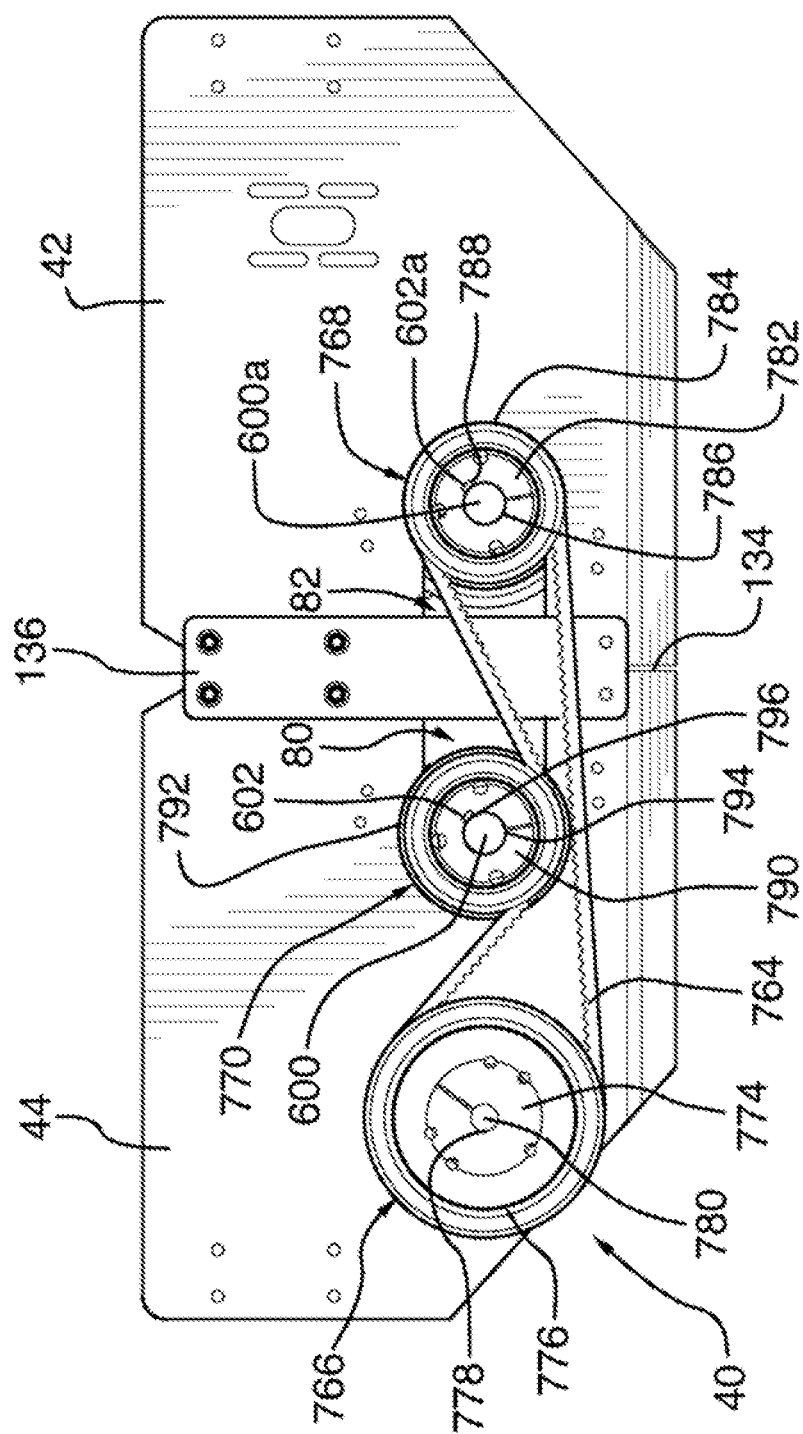
FIG. 7A is another top plan view similar to that shown in FIG. 6A except that the upper linkage mechanism connecting the left feeder roller to the right feeder roller has been removed to better reveal details of the drive assembly of the chipping subassembly.

With reference to FIGS. 3, 7A and 7B, the drive assembly 40 which drives rotation of the left and right chipping heads 36 and 38, is now described in greater detail. In this embodiment, the drive assembly 40 takes the form of a belt drive 760 operatively connected to a hydraulic motor 762. The belt drive 760 includes a notched belt 764, a driving pulley 766 connected to the hydraulic motor 762, a right driven pulley 768 attached to the right chipper head 38 and a left driven pulley 770 attached to the left chipper head 36. The inner surface of the notched belt 764 is provided with notches for tracked engagement with teeth (not shown) carried on the pulleys 766, 768 and 770.

The driving pulley 766 has a hub portion 774 and a flanged rim portion 776 surrounding the hub portion 774. The rim portion 776 is fixed for rotation with the hub portion 774. The hub portion 774 has a central aperture 778 which is sized to receive the drive shaft 780 of the hydraulic motor 762. The rim portion 776 has teeth (not shown) which engage the notches in the notched belt 764.

The right and left driven pulleys 768 and 770 are sized relatively smaller than the driven pulley 766. The right driven pulley 768 is similarly formed with a hub portion 782 and a flanged rim portion 784 surrounding the hub portion 782. The rim portion 784 is fixed for rotation with the hub portion 782. The hub portion 782 has a central aperture 786 which opens onto an elongate groove 788. The central aperture 776 receives the cylindrical portion 600 of the coupling member 552 with the keying projection 602 fitting into the groove 788 to fix the coupling member 552 for rotation with the hub portion 782.

The left driven pulley 770 is disposed between the driving pulley 766 and the right driven pulley 768. The left driven pulley 770 resembles the right driven pulley 768 in that it too has a hub portion 790 and a flanged rim portion 792 surrounding the hub portion 790. The rim portion 792 is fixed for rotation with the hub portion 790. The hub portion 790 has a central aperture 794 which opens onto an elongate groove 796. The central aperture 794 receives the cylindrical portion 600a of the coupling member 552 with the keying projection 602a fitting into the groove 796 to fix the coupling member 552 for rotation with the hub portion 790.

The notched belt 764 is operatively connected to the driving pulley 766, the left driven pulley 770 and the right driven pulley 768. The notched belt 764 is laid out between the driving pulley 766 and the left driven pulley 770 in a cross-belt arrangement such that the left driven pulley 770 is urged to rotate in a direction opposite to that of the driving pulley 766. In contrast, the notched belt 764 is laid out between the driving pulley 766 and the right driven pulley 768 in an open-belt arrangement such that the right driven pulley 768 is urged to rotate in the same direction as the driving pulley 766. It will thus be appreciated that by reason of this configuration, when the hydraulic motor 762 is actuated the right chipping head 38 is urged to rotate in a counter-clockwise direction and the left chipping head 36 is rotated in the clockwise direction.

The hydraulic motor 762 is mounted to the underside of the top left panel 44, with drive shaft 780 projecting through the circular aperture 132 defined in the panel 44 for connection to the driving pulley 766.

While in the present embodiment, the left and right chipping heads 36 and 38 are driven by a single motor and a drive belt arrangement, in an alternative embodiment, the chipping subassembly could be provided with two motors—one motor for directly driving each chipping head.

The brush chipper assembly 20 further includes a controller (not shown) which is operable to govern the operation of the drive assembly 40 and the drive blocks 346 and 496. More specifically, the controller can regulate the flow of hydraulic fluid to motors 462, 476 and 476a to adjust the speed at which the chipping heads 36 and 38 and the feeder rollers 26 and 28 rotate.

In an alternative embodiment of the brush chipper assembly, the chipping heads 36 and 38 are each disposed on a carriage 900 that is slidably engaged with a pair of guide poles 902, such that the left chipping head 36 and right chipping head 38 may move from a respective first position to a respective second position as a branch or other feedstock is fed from the feeder rollers 28 and 30 into the chipper assembly, thereby adjusting a gap between the outer boundaries of the chipping heads. A hydraulic piston 904 drives each carriage 900 inwardly and outwardly along the guide poles 902 in order to widen or narrow the gap between the chipping heads 36 and 38. This gap adjustment means allows the chipping heads 36 and 38 to accept feedstock that is larger in size and diameter than feedstock capable of fitting through and being cut by non-actuating chipping heads.

In this embodiment, the feeder rollers 28 and 30 each have at least one sensor thereon for detecting if the width of the gap G between the feeder rollers 28 and 30 exceeds a predetermined value. For example, as feedstock is urged into typical non-adjusting chipper assembly, the left and right chipping heads will cut into the left and right side of the feedstock, toward the center of the feedstock. If the chipping heads 36 and 38 each have a diameter of 12 inches, as feedstock is urged into the chipping assembly, each chipping head is able to cut 6 inches into the right and left side of the feedstock toward the center of the feedstock, meaning the chipper assembly can fully cut feedstock 12 inches in diameter and smaller. In the presently described embodiment, if chipping heads 36 and 38 are 12 inches in diameter, and if the sensors on the feeder rollers 28 and 30 detect the width of the gap G exceeding 12 inches due to feedstock larger than 12 inches in diameter, the chipping heads 36 and 38 may be triggered to move from a first respective position to a wider second respective position, thus allowing the chipper assembly to accept the larger diameter feedstock. This larger feedstock may be cut 6 inches deep on the right side and 6 inches deep on the left side, toward the center of the feedstock. However, since the feedstock exceeds 12 inches in diameter, an uncut center portion of the feedstock may remain and continue to pass through the chipping heads 36 and 38 where the uncut portion may abut against the frame 42 of the assembly.

The frame 42 of the assembly preferably includes at least one sensor to detect when an uncut portion of feedstock passes through the chipping heads 36 and 38. As an uncut portion of feedstock abuts against the frame 42 of the assembly and thereby comes in contact with the sensor, the chipping heads 36 and 38 are triggered to adjust inwardly to close the gap between the two chipping heads, thereby closing inwardly on the uncut portion of feedstock. The chipping heads 36 and 38 may then proceed to cut from the left and right side into the uncut portion of feedstock. The activation of the sensor on the frame 42 also triggers the feeder rollers 28 and 30 to stop rotating, thereby pausing the feeding of additional feedstock into the assembly. This process of pausing the feeder rollers 28 and 30 and triggering the inwardly closing of the chipping heads 36 and 38 may repeat and continue until the entire log or feedstock is cut.

A description of an exemplary mode of operation of the brush chipper assembly 20 now follows. As a first step, the hydraulic motor 762 of the drive assembly 40 is actuated causing the torque from its drive shaft 780 to be transmitted to the notched belt 764. As the notched belt 764 travels along the drive path defined by the driving pulley 770 and the right and left driven pulleys 768 and 770, it urges the right chipping head 38 to rotate in a clockwise direction and the left chipping head 36 to rotate in a counter-clockwise direction. The left and right chipping heads 36 and 38 are both rotated at the same, or substantially the same, speeds.

Preferably, the rotational speed of the chipping heads 36 and 38 ranges between 2000 and 3500 RPMs (revolutions per minute).

Next, the hydraulic motor 476 of the right feeder roller 30 and the hydraulic motor 476a of the left feeder rollers 28 are actuated causing the right feeder roller 30 to rotate in a clockwise direction and the left feeder roller 28 to rotate in a clockwise direction. The left and right feeder rollers 28 and 30 are both rotated at the same, or substantially the same speeds, by regulating the flow of hydraulic fluid to the hydraulic motors 476 and 476a. The controller adjusts the rotational speed of the feeder rollers 28 and 30 to ensure that the speed at which the feedstock is fed into the brush chipper assembly 20 is matched with the chipping capacity of the chipping heads 36 and 38 for optimized chipping efficiency.

With the feeder and chipping subassemblies 24 and 26 actuated, the brush chipper assembly 20 is ready to receive a branch or other feedstock (designated with reference numeral 810 in FIG. 10) to be reduced to chips 812. The operator of the brush chipper assembly 20 introduces or feeds the branch 810 into the feeder subassembly 24.

As the branch 810 approaches the gap G, its outer surface 814 is engaged (i.e. pierced or penetrated) by the spikes 368 on the right roller body 340 and the spikes 816 on the left roller body 490. The spikes 268 and 814 tightly grip the branch 810 and the counter-rotation of the feeder rollers 28 and 30 draws the branch 810 rearward toward the chipping subassembly 26.

Because the left and right feeder rollers 28 and 30 are biased in their respective first positions 334 and 335 and the diameter or width of the branch 810 is sized larger than the gap G, the branch 810 cannot pass through the gap G unless the biasing force of the upper and lower linkage mechanisms 32 and 34 is overcome. The counter-rotation of the feeder rollers 36 and 38 generates a propulsive force which is greater than the biasing force of the linkage mechanisms 32 and 34 causing the piston arm 264 of hydraulic piston 218 to move from its extended position 268 to its retracted position 266, and the piston arm 332 of hydraulic piston 278 to move from its extended position 333 to its retracted position. As the leading end of the branch 810 advances between the feeder rollers 36 and 38 it acts as a wedge between them, widening the gap G.

The propulsive force of the feeder rollers 36 and 38 conveys the branch 810 to the chipping subassembly 26 where the branch 810 is acted upon by the plurality of cutting teeth 540a and 540 of the left and right chipping heads 36 and 38. As the left chipping head 36 rotates in a counter-clockwise direction, the cutting edges 718a of the cutting teeth 540a are brought to bear against the leading end of the branch 810. Similarly, the clockwise rotation of the right chipping head 38 causes the cutting edges 718 of the cutting teeth 540 to come into contact with the leading end of the branch 810.

In the event that the branch 810 is of a size greater than the diameter of the roller bodies of the left and right chipping heads 36 and 38, sensors on the left and right feeder rollers 28 and 30 trigger the hydraulic pistons to move the carriages with the left and right chipping heads 36 and 38 to move the chipping heads 36 and 38 from a first position to a second position, thus widening the gap therebetween so that the left and right chipping heads 36 and 38 may accept the larger sized branch 810.

Contrary to conventional chippers where cutting edges chip the branch working from the outside toward the inside, the cutting edges 718a and 718 operate like mini-log splitters to split the inner portion of the branch 810 to produce chips 812. In essence, the cutting edges 718a and 718 chip the branch 810 working from the inside toward the outside. When the cutting edges 718a and 718 impact the branch 810, the cutting teeth 540a and 540 with their wedge-like profiles split the inner portion of the branch 810 as the branch 810 is urged deeper into the chipping subassembly 26 by the propulsive force of the feeder rollers 36 and 38. The horizontal component of the force generated by the impact of the cutting edges 718a and 718 on the branch 810, acts in a direction opposite to the direction of the propulsive force of the feeder rollers 36 and 38 (i.e. the direction of travel of the branch 810). As a result, this manner of chipping tends to be very effective. The branch 810 is broken down into large fragments which are then further reduced into smaller-sized chips.

With two counter-rotating chipping rollers 36 and 38, the brush chipper assembly 20 is able to expose the branch 810 to twice the effective cutting action of that of a single chipping roller of the same diameter. To achieve the same cutting action with a single chipping roller it would be necessary to use a chipping roller having a much larger diameter. Such a chipping roller would tend to be much heavier and therefore require a more powerful motor to drive it and more robust frame and bearing arrangement to accommodate its rotation. Moreover, it is likely that because of its weight and safety considerations related thereto, such a heavier chipping roller would not be driven as fast as two smaller and lighter chipping rollers, thus resulting in comparatively less frequent contact between the cutting teeth and the branch, and comparatively lower chipping efficiency.

The chips 812 thus produced are evacuated from the interior of the housing 22 by the rotational movement of the chipping heads 36 and 38. The chips 812 may follow one of several paths out the rear of the housing 22. One path has the chips 812 circulating in the well 193 between the curved portion 168 of the left sidewall member 52 and the left chipping head 36. Another path has the chips 812 travelling in the well 195 between the curved portion 194 of the right sidewall member 54 and the right chipping head 38.

In the event that the branch 810 is of a size greater than the diameter of the roller bodies of the left and right chipping heads 36 and 38, thus leaving an uncut center portion of branch 810 to continue through the chipper assembly beyond the chipping heads 36 and 38, this uncut portion may abut against the frame 42 of the housing that lies behind the chipping heads 36 and 38, thereby coming in contact with at least one sensor that may be present on the frame 42. Triggering this sensor on the frame 42 of the housing results in the actuation of the left and right chipping heads 36 and 38 to move inwardly from a second respective position back towards a first respective position, thus closing the gap between the chipping heads 36 and 38 inwardly on the uncut portion of branch 810. Triggering this sensor on the frame 42 also pauses operation of the feeder rollers 26 and 28 so that feedstock does not continue to be fed into the chipper assembly until the chipping heads 36 and 38 are ready to accept additional feedstock. Chipping heads 36 and 38 may then continue to cut away at the remaining uncut portion of branch 810, and this process may repeat until the entire branch 810 is reduced to chips.

In the embodiments described above and shown in FIGS. 1 to 5, the feeder rollers 28 and 30 and the chipping heads 36 and 38, are all vertically oriented. This need not be the case in every application. In other embodiments, the chipper assembly could be configured with its feeder rollers and chipping heads all oriented horizontally.

Although the foregoing description and accompanying drawings relate to specific preferred embodiments of the present invention as presently contemplated by the inventor, it will be understood that various changes, modifications and adaptations, may be made without departing from the spirit of the invention

What I claim is:

1. A brush chipper assembly comprising:
a housing;
a feeder subassembly connected to the housing; the feeder subassembly including vertically oriented and opposed, first and second feeder rollers; when the feeder subassembly is actuated, the first feeder roller is operable to rotate in a first direction and the second feeder roller is operable to rotate in a second direction so as to draw feedstock to be chipped into the housing in a first linear direction; the first direction being opposite to the second direction;
a chipping subassembly substantially contained within the housing behind the feeder subassembly in said first linear direction so that said feedstock is fed by said feeder subassembly directly into said chipping subassembly in said first linear direction; the chipping subassembly including first and second, vertically oriented and opposed chipping heads and a drive assembly for driving rotation of the first and second chipping heads; each chipping head carrying a plurality of cutting teeth for chipping the feedstock fed into the brush chipper assembly; when the chipping subassembly is actuated, the first chipping head is operable to rotate in a third direction and the second chipping head is operable to rotate in a fourth direction; the third direction being opposite to the fourth direction and the first direction; the fourth direction being opposite to the second direction.

2. A brush chipper assembly comprising:
a housing;
a feeder subassembly connected to the housing; the feeder subassembly including opposed, first and second feeder rollers; when the feeder subassembly is actuated, the first feeder roller is operable to rotate in a first direction and the second feeder roller is operable to rotate in a second direction so as to draw feedstock to be chipped into the housing; the first direction being opposite to the second direction; whereby the first and second feeder rollers are biased in respective first positions; when the feeder subassembly is actuated, the first and second feeder rollers being capable of being actuated to second respective positions, thereby adjusting the size of a gap defined by outer boundaries of the first and second feeder rollers;
a chipping subassembly substantially contained within the housing behind the feeder subassembly; the chipping subassembly including first and second, opposed chipping heads and a drive assembly for driving rotation of the first and second chipping heads; each chipping head carrying a plurality of cutting teeth for chipping the feedstock fed into the brush chipper assembly; whereby the first and second chipping heads are biased in respective first positions; when the chipping subassembly is actuated, the first and second chipping heads are capable of being actuated to second respective positions, thereby adjusting the size of a gap defined by outer boundaries of the first and second chipping heads for allowing the chipping subassembly to accept feedstock with a diameter exceeding the diameter of the first and second chipping heads; and whereby the chipping subassembly is actuated, the first chipping head is operable to rotate in a third direction and the second chipping head is operable to rotate in a fourth direction; the third direction being opposite to the fourth direction and the first direction; the fourth direction being opposite to the second direction.

3. The brush chipper assembly of claim 2, wherein the first and second feeder rollers include at least one sensor for detecting the width of the gap defined by outer boundaries of the first and second feeder rollers; whereupon detection of the width reaching a predetermined value triggers actuation of the first and second chipping heads to move from a respective first position to a respective second position.

4. The brush chipper assembly of claim 2, wherein the housing includes at least one sensor disposed behind the chipper subassembly for detecting contact with uncut feedstock being urged through the first and second chipping heads; whereby triggering the sensor on the housing activates the first and second feeder rollers to actuate inward to further cut a center portion of the uncut feedstock.

5. The brush chipper assembly of claim 4, whereby triggering of the sensor on the housing pauses operation of the first and second feeder rollers.

6. The brush chipper assembly of claim 2, further including an upper linkage mechanism and a lower linkage mechanism wherein the first and second feeder rollers are oriented along a vertical axis and connected therebetween, and whereby the first and second feeder rollers are operable to adjust the size of the gap defined by the outer boundaries of the first and second feeder rollers; and
the first and second chipping heads are oriented along a vertical axis and operably connected to the drive assembly for driving rotation of the first and second chipping heads.

7. The brush chipper assembly of claim 6 wherein the upper linkage mechanism includes a first primary linkage arm connected to the first feeder roller and second primary linkage arm connected to the second feeder roller; the first and second primary linkage arms connecting the first and second feeder rollers to the housing;
a first secondary linkage arm connected to the first primary linkage arm and a second secondary linkage arm connected to the second primary linkage arm; the first and second secondary linkage arms connecting the first and second primary linkage arms to a hydraulic piston; and
the hydraulic piston being operable to actuate the first and second feeder rollers to adjust the size of a gap defined therebetween.

8. The brush chipper assembly of claim 2 wherein the first and second feeder rollers carry a plurality of spikes spaced apart and adapted to penetrate the feedstock to allow the feedstock to be drawn into the assembly.

9. The brush chipper assembly of claim 8 wherein the spikes are arranged along a number of rows, and the spikes of any given row are longitudinally offset from the spikes in the next adjacent row.

10. The brush chipper assembly of claim 2 wherein the first and second feeder rollers are biased in respective first positions through a biasing force in order to maintain the gap at its smallest size; whereby a force applied against the first and second feeder rollers may overcome the biasing force, thereby adjusting the gap to its largest size and moving the first and second feeder rollers to their respective second positions.

11. The brush chipper assembly of claim 2 wherein the first and second chipping heads further include a cutting tooth assembly, each cutting tooth assembly including a cutting tooth mounted within a mounting assembly for securing the cutting tooth within a respective station; the cutting tooth having a base portion and a cutting portion extending from the base portion a generally canted fashion; the cutting portion having a tapering, wedge-shaped profile terminating in a cutting edge; the cutting tooth being mounted within the station such that the cutting edge is the first element of the cutting tooth to make contact with the brush when the first and second chipping heads are rotated.

12. The brush chipper assembly of claim 2 wherein the first and second chipping heads are counter-rotated such that said plurality of cutting teeth are brought to hear against the leading edge of the feedstock thus splitting the inner portion of the brush, working from the inside of the feedstock toward the outside of the feedstock, as the feedstock is urged deeper into the chipping subassembly.

13. The brush chipper assembly of claim 2 wherein the rotation and force generated by the impact of said plurality of cutting teeth on the feedstock acts in a direction opposite to the direction of rotation and propulsive force of the first and second feeder rollers.

14. The brush chipper assembly of claim 1 wherein the direction of rotation and propulsive force of the first and second feeder rollers acts in a direction opposite to the direction of rotation and propulsive force of the first and second chipping heads, whereby the direction of rotation and propulsive force of the feeder rollers facilitate the cutting of the feedstock by pushing the feedstock against the cutting teeth as the chipping heads rotated push against the propulsive force of the feeder rollers.

15. The brush chipper assembly of claim 2 wherein the first and second feeder rollers rotate in a direction toward the first and second chipping heads, such that the first and second feeder rollers urge the feedstock onto the cutting teeth of the first and second chipping heads.

16. The brush chipper assembly of claim 15 wherein the first chipping head cuts one side of the feedstock and the second chipping head cuts a second side of the feedstock, whereby the feedstock is cut from the leading portion of the feedstock to the lagging portion of the feedstock.

17. The brush chipper assembly of claim 16, wherein any uncut leading portion of feedstock triggers a sensor on the housing that actuates the first and second chipping heads to close it the uncut leading portion of feedstock for further cutting.

18. A method of chipping brush, comprising the steps of:
providing a housing;
providing a feeder subassembly connected to the housing; the feeder subassembly including opposed, first and second feeder rollers; when the feeder subassembly is actuated, the first feeder roller is operable to rotate in a first direction and the second feeder roller is operable to rotate in a second direction so as to draw the brush to be Chipped into the housing in a horizontal direction; the first direction being opposite to the second direction;
providing a chipping subassembly substantially contained within the housing behind the feeder subassembly so that said feedstock is fed by said feeder subassembly directly into said chipping subassembly in said horizontal direction; the chipping subassembly including first and second, opposed chipping heads and a drive assembly for driving rotation of the first and second chipping heads; each chipping head carrying a plurality of cutting teeth for chipping the brush fed into the brush chipper assembly; when the chipping subassembly is actuated, the first chipping head is operable to rotate in a third direction and the second chipping head is operable to rotate in a fourth direction; the third direction being opposite to the fourth direction and the first direction; the fourth direction being opposite to the second direction;
rotating the first feeder roller in a first direction and rotating the second feeder roller in a second direction; the first direction being opposite to the second direction;
rotating the first chipping head in a third direction and the second chipping in a fourth direction; the third direction being opposite to the fourth direction and the first direction; the fourth direction being opposite to the second direction;
feeding feedstock into the brush chipper assembly; and
splitting the inner portion of the feedstock from the inside of the feedstock toward the outside of the feedstock, as the feedstock is urged deeper into the chipping subassembly.

19. The method of claim 18, further comprising the steps of:
actuating the first and second feeder rollers to move from a first respective position to a second respective position, thereby adjusting the size of a gap defined by outer boundaries of the first and second feeder rollers; and
actuating the first and second chipping heads to move from a first respective position to a second respective position, thereby adjusting the size of a gap defined by outer boundaries of the first and second chipping heads.

20. The method of claim 19, further comprising the steps of:
providing at least one sensor on said first and second feeder rollers for detecting the width of the gap defined by outer boundaries of the first and second feeder rollers; and
providing at least one sensor on the housing for detecting contact with uncut feedstock urged though the first and second chipping heads.

* * * * *

UNITED STATES PATENT AND TRADEMARK OFFICE
CERTIFICATE OF CORRECTION

PATENT NO. : 10,440,898 B2
APPLICATION NO. : 15/437708
DATED : October 15, 2019
INVENTOR(S) : Daniel Gaudreault Page 1 of 1

It is certified that error appears in the above-identified patent and that said Letters Patent is hereby corrected as shown below:

In the Specification

In the first column, above FIELD OF THE INVENTION, the following should be added:

CROSS REFERENCE TO RELATED APPLICATIONS
This application is a Continuation of U.S. Application No. 14/462,734, filed August 19, 2014, entitled Brush Chipper Assembly with Counter-Rotating Feeder Rollers and Actuating Chipping Heads. All of the foregoing applications are hereby incorporated by reference in their entireties.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*